(12) United States Patent
Akashika et al.

(10) Patent No.: US 10,062,070 B2
(45) Date of Patent: Aug. 28, 2018

(54) ELECTRONIC MONEY SYSTEM, ELECTRONIC VALUE TRANSFER METHOD, MOBILE TERMINAL, METHOD FOR CONTROLLING MOBILE TERMINAL, PROGRAM PRODUCT, AND RECORDING MEDIUM ON WHICH PROGRAM PRODUCT IS RECORDED

(71) Applicant: Rakuten, Inc., Tokyo (JP)

(72) Inventors: Hideki Akashika, Tokyo (JP); Yutaka Jinno, Tokyo (JP)

(73) Assignee: Rakuten, Inc., Setagaya-ku, Tokyo (JP)

( * ) Notice: Subject to any disclaimer, the term of this patent is extended or adjusted under 35 U.S.C. 154(b) by 397 days.

(21) Appl. No.: 14/648,037

(22) PCT Filed: Nov. 30, 2012

(86) PCT No.: PCT/JP2012/081211
§ 371 (c)(1),
(2) Date: May 28, 2015

(87) PCT Pub. No.: WO2014/083709
PCT Pub. Date: Jun. 5, 2014

(65) Prior Publication Data
US 2015/0310416 A1 Oct. 29, 2015

(51) Int. Cl.
*G06Q 20/00* (2012.01)
*G06Q 20/32* (2012.01)
(Continued)

(52) U.S. Cl.
CPC ......... *G06Q 20/32* (2013.01); *G06Q 20/3272* (2013.01); *G06Q 20/36* (2013.01); *G06Q 20/363* (2013.01); *H04B 11/00* (2013.01)

(58) Field of Classification Search
CPC ...... G06Q 20/327; G06Q 20/32; G06Q 20/18; G06Q 30/0267; G06Q 20/34;
(Continued)

(56) References Cited

U.S. PATENT DOCUMENTS

| | | | |
|---|---|---|---|
| 4,736,094 A | * | 4/1988 | Yoshida ............... G06Q 20/105 235/380 |
| 6,397,198 B1 | * | 5/2002 | Hoffman ................. G06F 21/32 705/18 |

(Continued)

FOREIGN PATENT DOCUMENTS

JP 2007-199831 A 8/2007

OTHER PUBLICATIONS

Lawson, Stephen, "Sound-based system promises chipless NFC now", IDG News Service. Jun. 20, 2011. pp. 1-3.*

*Primary Examiner* — Mohammad Z Shaikh
(74) *Attorney, Agent, or Firm* — Sughrue Mion, PLLC

(57) ABSTRACT

Example embodiments enable a server-side value stored in an electronic money server to be transmitted automatically to a mobile terminal prior to payment. This enables payments when a payment terminal only processes payments based on the terminal-side value balance. An asynchronous payment terminal emits ultrasonic waves indicating that the payment terminal is not compatible with payment processes on the basis of a server-side balance. If the mobile terminal determines that the volume of the detected ultrasonic waves corresponds to a received ultrasonic wave pattern that appears while the mobile terminal is near the ultrasonic wave emission source, the mobile terminal transmits a value shift request to an electronic money server that then subtracts a predetermined amount from the server-side value balance, and transmits amount change information which increases the terminal-side value balance by that predeter- (Continued)

mined amount. An IC module then updates (increases) the terminal-side value balance.

11 Claims, 13 Drawing Sheets

(51) Int. Cl.
*G06Q 20/36* (2012.01)
*H04B 11/00* (2006.01)

(58) Field of Classification Search
CPC ... G07F 17/3246; G10L 19/018; G10L 25/78; G10L 17/00
See application file for complete search history.

(56) References Cited

U.S. PATENT DOCUMENTS

| | | | | |
|---|---|---|---|---|
| 6,607,146 | B1* | 8/2003 | Alness | A01M 7/0064 239/159 |
| 6,796,491 | B2* | 9/2004 | Nakajima | G06Q 20/04 235/379 |
| 7,334,735 | B1* | 2/2008 | Antebi | G01S 5/22 235/492 |
| 7,676,835 | B2* | 3/2010 | Brannon | G06F 21/6218 726/10 |
| 8,468,101 | B1* | 6/2013 | Kawai | G06Q 40/02 379/114.27 |
| 8,701,166 | B2* | 4/2014 | Courtney | G06F 21/36 726/5 |
| 9,098,865 | B2* | 8/2015 | Anand | H04B 5/0031 |
| 9,183,552 | B2* | 11/2015 | Kauniskangas | G06Q 20/20 |
| 9,213,969 | B2* | 12/2015 | Arentz | H04B 11/00 |
| 2004/0158565 | A1* | 8/2004 | Kakuta | G06F 17/30867 |
| 2005/0067557 | A1* | 3/2005 | Wong | G09B 19/167 250/221 |
| 2005/0097320 | A1* | 5/2005 | Golan | G06F 21/40 713/166 |
| 2005/0154925 | A1* | 7/2005 | Chitrapu | H04W 12/04 726/19 |
| 2005/0177484 | A1* | 8/2005 | Jentoft | G06Q 20/102 705/35 |
| 2005/0203841 | A1* | 9/2005 | Hoffman | G06F 21/32 705/39 |
| 2005/0228720 | A1* | 10/2005 | Pavlic | G06Q 20/04 705/16 |
| 2006/0196412 | A1* | 9/2006 | Mutz | B29C 33/0044 117/95 |
| 2010/0256976 | A1* | 10/2010 | Atsmon | G06F 21/34 704/231 |
| 2011/0191253 | A1* | 8/2011 | Pilskalns | G06Q 20/3829 705/71 |
| 2011/0258121 | A1* | 10/2011 | Kauniskangas | G06Q 20/20 705/67 |
| 2011/0270764 | A1* | 11/2011 | Mizani Oskui | G06Q 20/325 705/75 |
| 2012/0130866 | A1* | 5/2012 | Cooke | G06Q 30/0643 705/27.2 |
| 2013/0203345 | A1* | 8/2013 | Fisher | H04B 11/00 455/41.1 |
| 2013/0268277 | A1* | 10/2013 | Duplan | H04W 4/80 704/500 |
| 2014/0052631 | A1* | 2/2014 | Akashika | G06Q 20/28 705/41 |
| 2014/0108252 | A1* | 4/2014 | Itwaru | G06Q 20/202 705/44 |
| 2014/0201069 | A1* | 7/2014 | Arentz | H04B 11/00 705/39 |
| 2015/0019419 | A1* | 1/2015 | Suzukake | G06Q 20/10 705/41 |
| 2015/0228044 | A1* | 8/2015 | Jinno | G06F 21/32 705/13 |
| 2015/0310416 | A1* | 10/2015 | Akashika | G06Q 20/32 705/39 |

* cited by examiner

Fig.6(a)
USER DB

| USER ID | SERVER-SIDE ELECTRONIC MONEY NUMBER | SERVER-SIDE VALUE BALANCE | TERMINAL-SIDE ELECTRONIC MONEY NUMBER | TERMINAL-SIDE VALUE BALANCE |
|---|---|---|---|---|
| 1 2 ⋯ | ⋯ | 7 5 0 0 | ⋯ | 7 4 5 0 |
| 1 4 ⋯ | ⋯ | 1 0 3 0 0 | ⋯ | 1 9 5 0 0 |
| 2 0 ⋯ | ⋯ | 9 6 0 0 | ⋯ | 4 5 0 |
| 2 1 ⋯ | ⋯ | 1 0 9 6 0 | ⋯ | 1 7 0 0 |
|  |  |  |  |  |

Fig.6(b)
MEMBER STORE DB

| MEMBER STORE ID | SYNCHRONOUS-TYPE PAYMENT TERMINAL ID | ASYNCHRONOUS PAYMENT TERMINAL ID | ⋯ |
|---|---|---|---|
| 5 7 9 ⋯ | 6 7 8 ⋯ | — | ⋯ |
| 8 5 2 ⋯ | — | 9 5 7 ⋯ | ⋯ |
| 1 8 9 ⋯ | — | — | ⋯ |
| ⋮ | ⋮ | ⋮ | ⋮ |

Fig.11
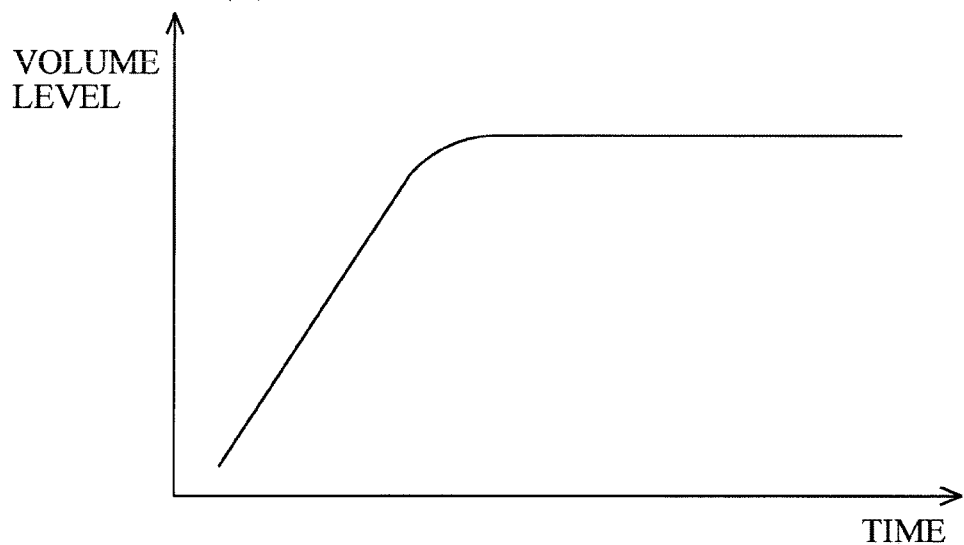
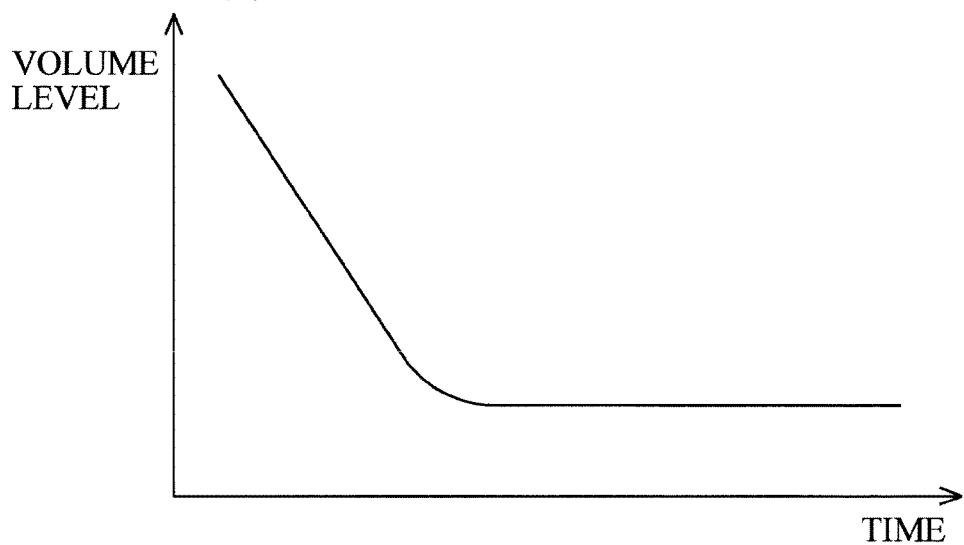

ELECTRONIC MONEY SYSTEM, ELECTRONIC VALUE TRANSFER METHOD, MOBILE TERMINAL, METHOD FOR CONTROLLING MOBILE TERMINAL, PROGRAM PRODUCT, AND RECORDING MEDIUM ON WHICH PROGRAM PRODUCT IS RECORDED

CROSS REFERENCE TO RELATED APPLICATIONS

This application is a National Stage of International Application No. PCT/JP2012/081211, filed Nov. 30, 2012, the contents of which are incorporated herein by reference in its entirety.

TECHNICAL FIELD

The present invention relates to electronic money systems, electronic money value transfer methods, mobile terminals, methods for controlling the mobile terminal, program products, and recording media on which the program product is recorded.

BACKGROUND ART

In recent years, the use of electronic money has become widespread. In electronic money, amount information called value is related to money value and fund settlement is performed by increasing or decreasing the value balance.

FIG. 13 is a diagram for explaining an existing electronic money system.

A mobile terminal 5 is a mobile terminal owned by the user, and the balance of value, an IC module ID by which an IC module is identified, an electronic money number, and so forth are stored in an IC module incorporated into or attached to the mobile terminal 5. Moreover, there is also an electronic money card 100 having the IC module incorporated thereinto or attached thereto.

A method of holding value in a user s-side IC module in this manner is called a stored value type.

An asynchronous payment terminal 7 is installed in a store, an automatic vending machine, and so forth, and performs payment by value by reducing the value balance stored in the IC module by performing short-distance radio communication with the IC module of the mobile terminal 5 or the electronic money card 100.

The asynchronous payment terminal 7 completes the payment processing locally between the asynchronous payment terminal 7 and the IC module of the user without connecting to an electronic money server 2 and records the transaction history as log data.

Then, the asynchronous payment terminal 7 collectively sends the log data to the electronic money server 2 later at regular or irregular intervals.

The reason why the asynchronous payment terminal 7 is called "asynchronous" is that the asynchronous payment terminal completes payment processing locally without being synchronous with the electronic money server 2.

In such a system of stored value-type electronic money, since the value balance is stored in the IC module in advance and the value balance is reduced at the time of payment, if there is not enough value, it is impossible to perform payment. For this reason, processing called recharging that increases the balance of value stored in the IC module is required. This recharging is generally performed in exchange for money in a store and the exchange value of value is guaranteed.

On the other hand, in recent years, with an improvement in the communications capacity of the network, a server management-type system that manages value with the electronic money server 2 and performs payment processing on the server's side has also become known. It is expected that, with the improvement of a network infrastructure, such a server management-type system will become gradually widespread.

Such a kind of electronic money that manages value with the server will be referred to as server-type electronic money. In a system of this server-type electronic money, since value is not managed by an IC module, it is necessary to synchronize it with value managed by the electronic money server 2 at all times. Therefore, a payment terminal used is a synchronous-type payment terminal, not the asynchronous payment terminal 7.

In the system of server-type electronic money, as described in Patent Document 1, a mechanism in which, when the user holding a mobile terminal having the payment function using electronic money enters an area around a place where a payment terminal having the payment function using electronic money is installed, access is made to an electronic money server depending on the selection made by the user and the mobile terminal is recharged with electronic money has been known.

With such a mechanism, a situation in which payment becomes impossible due to a shortage of the balance is prevented.

CITATION LIST

Patent Literature

Patent Document 1: JP-A-2007-199831

DISCLOSURE OF INVENTION

Problem to be Solved by the Invention

Incidentally, in an actual store, as described above, the real picture is as follows: a payment terminal (an asynchronous-type payment terminal) which is used in the stored value-type electronic money system and a payment terminal (a synchronous-type payment terminal) which is used in the system of server-type electronic money coexist. For this reason, in payment service using a value balance which is stored on the server's side, if the payment terminal does not have the function of accepting payment by server-side value, that is, the synchronizing function, it used to be impossible to perform payment.

A problem to be solved by the present invention is to make it possible to perform payment with a payment terminal having only the payment function using a terminal-side value balance by automatically transferring electronic value which is managed on the server's side to the terminal's side.

SUMMARY OF THE INVENTION

Example embodiments according to the present disclosure provide an electronic money system that includes a mobile terminal that is accessible to an IC module including a unit storing a terminal-side balance of electronic value and a unit changing the terminal-side balance by using amount change information; a server device that includes a unit generating amount change information which changes the terminal-side balance, a unit sending the generated amount change information to the IC module via the mobile terminal, a unit storing a server-side balance that is usable for payment using electronic value in a state in which the server-side balance is related to the IC module, and a unit updating the server-side balance; and an asynchronous-type payment terminal that includes a unit sending, to the IC module, the amount change information which is generated by the unit generating the amount change information which changes the terminal-side balance and does not include a unit mediating, in real time, payment processing using the server-side balance, the payment processing which is performed between the IC module and the server device, wherein the electronic money system further comprises: an ultrasonic wave emission source that emits an ultrasonic wave in a vicinity of the asynchronous-type payment terminal, and the mobile terminal includes a storing unit that stores an approach pattern indicating a pattern of a volume level which is observed when a sound inputting unit that inputs the ultrasonic wave which is emitted from the ultrasonic wave emission source approaches the ultrasonic wave emission source, and a requesting unit that sends, if a determination is made that a volume level of the ultrasonic wave which is input by the sound inputting unit corresponds to the approach pattern stored in the storing unit, an electronic value downloading request to the server device such that at least part of the server-side balance stored in a state in which the server-side balance is related to the IC module is reduced and the terminal-side balance stored in the IC module is increased by an amount corresponding to the reduction of the server-side balance.

In some embodiments, the storing unit further stores a moving-away pattern indicating a pattern of a volume level which is observed when the sound inputting unit moves away from the ultrasonic wave emission source, and the requesting unit sends, if a determination is made that a volume level of the ultrasonic wave which is input by the sound inputting unit corresponds to the moving-away pattern stored in the storing unit, an electronic value uploading request to the server device such that at least part of the terminal-side balance stored in the IC module is reduced and the server-side balance stored in a state in which the server-side balance is related to the IC module is increased by an amount corresponding to the reduction of the terminal-side balance.

In some embodiments, the requesting unit sends the uploading request including an uploading amount which is set such that the terminal-side balance more than or equal to a predetermined amount is left.

In some embodiments, the asynchronous-type payment terminal further includes an sound outputting unit corresponding to the ultrasonic wave emission source, the sound outputting unit of the asynchronous-type payment terminal outputs the ultrasonic wave indicating that payment using the server-side balance is impossible, and the requesting unit sends the downloading request only when a determination is made that payment using the server-side balance is impossible based on the ultrasonic wave which is input by the sound inputting unit.

In some embodiments, the electronic money system includes a hybrid-type payment terminal including a unit sending, to the IC module, amount change information which is generated by the unit generating the amount change information which changes the terminal-side balance, a unit mediating, in real time, payment processing using the server-side balance, the payment processing which is performed between the IC module and the server device, and a sound outputting unit corresponding to the ultrasonic wave emission source, the sound outputting unit of the hybrid-type payment terminal outputs the ultrasonic wave indicating that payment using the server-side balance is temporarily impossible when payment using the server-side balance is temporarily impossible, and the requesting unit sends the downloading request only when a determination is made that payment using the server-side balance is impossible based on the ultrasonic wave which is input by the sound inputting unit.

In some embodiments, the sound outputting unit outputs an ultrasonic wave of a sound pattern whose volume level varies with a predetermined period such that a distinction from other payment terminals installed in a vicinity thereof is made.

In some embodiments, the sound outputting unit outputs an ultrasonic wave of a sound pattern whose frequency varies with a predetermined period such that a distinction from other payment terminals installed in a vicinity thereof is made.

In some embodiments, the sound outputting unit further outputs, every time a price of an object whose payment is to be performed is registered, an ultrasonic wave for determining a price range, the ultrasonic wave of a frequency related to a price range in a predetermined amount region to which a temporary payment amount to the point of time belongs, and the mobile terminal further includes a determining unit that determines a price range based on the ultrasonic wave for determining a price range, the ultrasonic wave which is output, and a notifying unit that notifies, if a determination is made that the price range determined by the determining unit is identical to a price range to which the terminal-side balance stored in the IC module belongs or corresponds to a price range lower than the price range to which the terminal-side balance stored in the IC module belongs by a predetermined level, a user that the terminal-side balance is likely to become insufficient for a payment amount.

In some embodiments, the sound outputting unit outputs, every time a price of an object whose payment is to be performed is registered, a temporary payment amount to the point of time over the ultrasonic wave, and the mobile terminal further includes an acquiring unit that acquires the temporary payment amount which is output over the ultrasonic wave, and a notifying unit that notifies, if a determination is made that a difference between the temporary payment amount which is acquired by the acquiring unit and the terminal-side balance stored in the IC module is smaller than a predetermined threshold value, a user that the terminal-side balance is likely to become insufficient for a payment amount.

Example embodiments according to the present disclosure provide an electronic value transfer method in which a mobile terminal that is accessible to an IC module including a unit storing a terminal-side balance of electronic value and a unit changing the terminal-side balance by using amount change information and includes a storing unit that stores an approach pattern indicating a pattern of a volume level which is observed when a sound inputting unit that inputs an ultrasonic wave which is emitted from an ultrasonic wave emission source emitting an ultrasonic wave in a vicinity of an asynchronous-type payment terminal approaches the ultrasonic wave emission source, the asynchronous-type payment terminal which includes a unit sending, to the IC module, the amount change information which is generated by the unit generating the amount change information which changes the terminal-side balance and does not include a unit mediating, in real time, payment processing using the server-side balance, the payment processing which is performed between the IC module and a server device, the mobile terminal performing determining processing by which a determination as to whether or not a volume level of the ultrasonic wave which is input by the sound inputting unit corresponds to the approach pattern stored in the storing unit is made and requesting processing by which an electronic value downloading request is sent to the server device if a determination is made that the volume level of the ultrasonic wave which is input by the sound inputting unit corresponds to the approach pattern, and the server device including a unit storing a server-side balance that is usable for payment using electronic value in a state in which the server-side balance is related to the IC module performs server-side balance updating processing by which at least part of the server-side balance stored in a state in which the server-side balance is related to the IC module is reduced, generating processing by which amount change information which increases the terminal-side balance stored in the IC module by an amount corresponding to the reduction of the server-side balance is generated, and terminal-side balance changing processing by which the generated amount change information is sent to the IC module via the mobile terminal.

Example implementations according to the present disclosure provide a mobile terminal that mediates communication between an IC module including a unit storing a terminal-side balance of electronic value and a unit changing the terminal-side balance by using amount change information and a server device including a unit generating amount change information which changes the terminal-side balance and a unit sending the generated amount change information to the IC module via the mobile terminal. The mobile terminal includes a storing unit that stores an approach pattern indicating a pattern of a volume level which is observed when a sound inputting unit that inputs an ultrasonic wave which is emitted from an ultrasonic wave emission source emitting an ultrasonic wave in a vicinity of an asynchronous-type payment terminal approaches the ultrasonic wave emission source, the asynchronous-type payment terminal which includes a unit sending, to the IC module, the amount change information which is generated by the unit generating the amount change information which changes the terminal-side balance and does not include a unit mediating, in real time, payment processing using a server-side balance, the payment processing which is performed between the IC module and the server device; a determining unit that determines whether or not a volume level of the ultrasonic wave which is input by the sound inputting unit corresponds to the approach pattern stored in the storing unit; and a requesting unit that sends, if a determination is made by the determining unit that the volume level of the ultrasonic wave which is input by the sound inputting unit corresponds to the approach pattern, an electronic value downloading request to the server device further including a unit storing a server-side balance that is usable for payment using electronic value in a state in which the server-side balance is related to the IC module and a unit updating the server-side balance, such that at least part of the server-side balance stored in a state in which the server-side balance is related to the IC module is reduced and the terminal-side balance stored in the IC module is increased by an amount corresponding to the reduction of the server-side balance.

Example implementations according to the present disclosure provide a method for controlling a mobile terminal mediating communication between an IC module including a unit storing a terminal-side balance of electronic value and a unit changing the terminal-side balance by using amount change information and a server device including a unit generating amount change information which changes the terminal-side balance and a unit sending the generated amount change information to the IC module via the mobile terminal. The method includes storing an approach pattern indicating a pattern of a volume level which is observed when a sound inputting unit that inputs an ultrasonic wave which is emitted from an ultrasonic wave emission source emitting an ultrasonic wave in a vicinity of an asynchronous-type payment terminal approaches the ultrasonic wave emission source, the asynchronous-type payment terminal which includes a unit sending, to the IC module, the amount change information which is generated by the unit generating the amount change information which changes the terminal-side balance and does not include a unit mediating, in real time, payment processing using the server-side balance, the payment processing which is performed between the IC module and the server device; a determining step of determining whether or not a volume level of the ultrasonic wave which is input by the sound inputting unit corresponds to the approach pattern stored in the storing step; and a requesting step of sending, if a determination is made in the determining step that the volume level of the ultrasonic wave which is input by the sound inputting unit corresponds to the approach pattern, an electronic value downloading request to the server device further including a unit storing a server-side balance that is usable for payment using electronic value in a state in which the server-side balance is related to the IC module and a unit updating the server-side balance, such that at least part of the server-side balance stored in a state in which the server-side balance is related to the IC module is reduced and the terminal-side balance stored in the IC module is increased by an amount corresponding to the reduction of the server-side balance.

Example embodiments according to the present disclosure provide a non-transitory computer readable storage medium that stores a program, the program causing a computer processing system to execute processing of mediating, by a mobile terminal, communication between an IC module including a unit storing a terminal-side balance of electronic value and a unit changing the terminal-side balance by using amount change information and a server device including a unit generating amount change information which changes the terminal-side balance and a unit sending the generated amount change information to the IC module via the mobile terminal. The program includes a storing function of storing an approach pattern indicating a pattern of a volume level which is observed when a sound inputting unit that inputs an ultrasonic wave which is emitted from an ultrasonic wave emission source emitting an ultrasonic wave in a vicinity of an asynchronous-type payment terminal approaches the ultrasonic wave emission source, the asynchronous-type payment terminal which includes a unit sending, to the IC module, the amount change information which is generated by the unit generating the amount change information which changes the terminal-side balance and does not include a unit mediating, in real time, payment processing using the server-side balance, the payment processing which is performed between the IC module and the server device; a determining function of determining whether or not a volume level of the ultrasonic wave which is input by the sound inputting unit corresponds to the approach pattern stored by the storing function; and a requesting function of sending, if a determination is made by the determining function that the volume level of the ultrasonic wave which is input by the sound inputting unit corresponds to the approach pattern, an electronic value downloading request to the server device further including a unit storing a server-side balance that is usable for payment using electronic value in a state in which the server-side balance is related to the IC module and a unit updating the server-side balance, such that at least part of the server-side balance stored in a state in which the server-side balance is related to the IC module is reduced and the terminal-side balance stored in the IC module is increased by an amount corresponding to the reduction of the server-side balance.

Example embodiments according to the present disclosure provide a non-transitory computer readable storage medium that stores a program, the program causing a computer processing system to execute processing of mediating, by a mobile terminal, communication between an IC module including a unit storing a terminal-side balance of electronic value and a unit changing the terminal-side balance by using amount change information and a server device including a unit generating amount change information which changes the terminal-side balance and a unit sending the generated amount change information to the IC module via the mobile terminal. The program includes a storing function of storing an approach pattern indicating a pattern of a volume level which is observed when a sound inputting unit that inputs an ultrasonic wave which is emitted from an ultrasonic wave emission source emitting an ultrasonic wave in a vicinity of an asynchronous-type payment terminal approaches the ultrasonic wave emission source, the asynchronous-type payment terminal which includes a unit sending, to the IC module, the amount change information which is generated by the unit generating the amount change information which changes the terminal-side balance and does not include a unit mediating, in real time, payment processing using the server-side balance, the payment processing which is performed between the IC module and the server device; a determining function of determining whether or not a volume level of the ultrasonic wave which is input by the sound inputting unit corresponds to the approach pattern stored by the storing function; and a requesting function of sending, if a determination is made by the determining function that the volume level of the ultrasonic wave which is input by the sound inputting unit corresponds to the approach pattern, an electronic value downloading request to the server device further including a unit storing a server-side balance that is usable for payment using electronic value in a state in which the server-side balance is related to the IC module and a unit updating the server-side balance, such that at least part of the server-side balance stored in a state in which the server-side balance is related to the IC module is reduced and the terminal-side balance stored in the IC module is increased by an amount corresponding to the reduction of the server-side balance.

Effect of the Invention

According to the present invention, server-side value is automatically transferred to the mobile terminal's side, whereby it becomes possible to perform payment with a payment terminal having only the payment function using a terminal-side value balance.

BRIEF DESCRIPTION OF DRAWINGS

FIGS. 6(a) and 6(b) are diagrams for explaining a user DB and a member store DB of the electronic money server;

FIG. 11 is a diagram depicting an example of a pattern which is referred to in order to determine a received ultrasonic wave;

Figure 1:
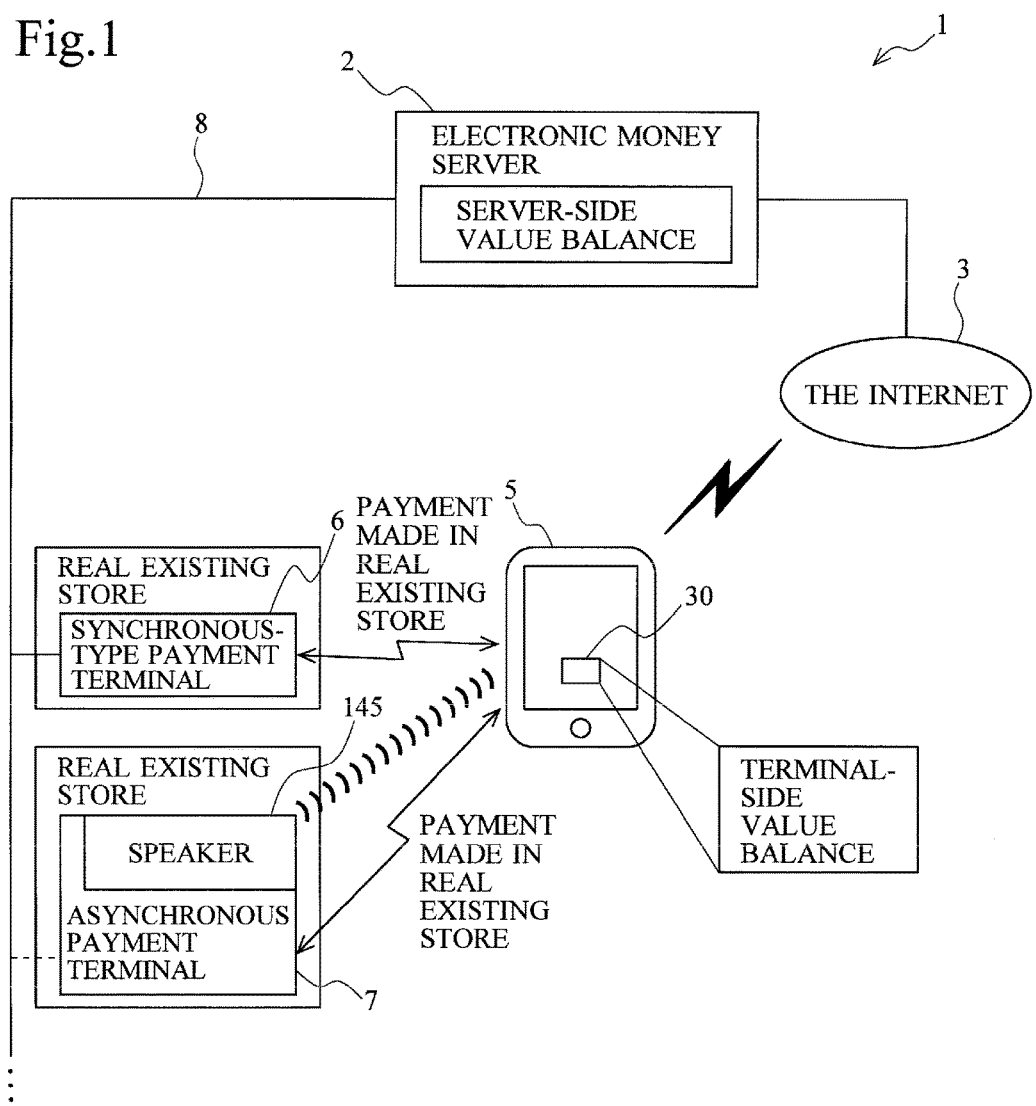
FIG. 1 is a diagram for explaining the network configuration of an electronic money system according to this embodiment.

DESCRIPTION OF EMBODIMENTS (1) Outline of an Embodiment

This embodiment is predicated on an electronic money system in which the balance of electronic value is stored in an IC module 30 which is incorporated into or attached to a mobile terminal 5 and a storing section 35 which is incorporated into or connected to an electronic money server 2. These balances are independent from each other (that is, are not in synchronization with each other) and can each be used for payment performed by a corresponding payment terminal or the like. In the following description, the balance of electronic value stored on the side of the mobile terminal 5 will be referred to as a "terminal-side value balance" (a terminal-side balance) and the balance of electronic value stored on the side of the electronic money server 2 will be referred to as a "server-side value balance" (a server-side balance).

A payment terminal (for example, a synchronous-type payment terminal 6) having the function of mediating, in real time, payment processing which is performed between the electronic money server 2 and the IC module 30 handles direct payment using the server-side value balance. On the other hand, a payment terminal (for example, an asynchronous payment terminal 7) without this function does not handle direct payment using the server-side value balance. Therefore, in this embodiment, an ultrasonic wave indicating that it is impossible to handle payment processing using the server-side balance is emitted from an ultrasonic wave emission source installed near the payment terminal.

When an emitted ultrasonic wave is detected by a microphone 20 of the mobile terminal 5, the mobile terminal 5 first determines that payment using the server-side value balance is impossible in a payment terminal (here, an asynchronous payment terminal 7 provided with a speaker 145 which is the emission source) related to the emission source of the ultrasonic wave.

If it is determined that payment using the server-side value balance is impossible, the mobile terminal 5 further determines whether or not the volume level of the detected ultrasonic wave corresponds to a received ultrasonic wave pattern (an approach pattern) which is typically observed when the mobile terminal 5 is approaching the emission source of the ultrasonic wave. If it is determined that the volume level corresponds to the approach pattern, the mobile terminal 5 sends, to the electronic money server 2, a request (a downloading request) to shift value.

Having received this downloading request, in order to shift (transfer) the server-side value balance to the terminal's side, the electronic money server 2 reduces the server-side value balance by a predetermined amount and then sends, to the mobile terminal 5, amount change information which increases the terminal-side value balance by the predetermined amount. The IC module 30 that has received this amount change information updates (increases) the terminal-side value balance based on the amount change information. Then, bypassing the mobile terminal 5 over a reader/writer section 139, it is possible to perform payment with the asynchronous payment terminal 7 by using this terminal-side value balance.

Then, in the mobile terminal 5, it is determined whether or not the volume level of the detected ultrasonic wave corresponds to a received ultrasonic wave pattern (a moving-away pattern) which is typically observed when the mobile terminal 5 is moving away from the emission source of the ultrasonic wave. If it is determined that the volume level corresponds to the moving-away pattern, the mobile terminal 5 sends, to the electronic money server 2, a request (an uploading request) to shift value.

Having received this uploading request, in order to shift (transfer) the terminal-side value balance to the server's side, the electronic money server 2 sends, to the mobile terminal 5, amount change information which reduces the terminal-side value balance by a predetermined amount. The IC module 30 that has received this amount change information updates (reduces) the terminal-side value balance based on the amount change information. Then, the server-side value balance is increased by this predetermined amount.

(2) Details of the Embodiment

FIG. 1 is a diagram for explaining the network configuration of an electronic money system 1 according to a first embodiment.

The electronic money system 1 is configured by using the electronic money server 2, the Internet 3, the mobile terminal 5, the synchronous-type payment terminal 6, the asynchronous payment terminal 7, a communication line 8, and so forth.

In this electronic money system 1, a server management-type system using the server-side value balance and a stored value-type system using the terminal-side value balance coexist.

The electronic money server 2 is a server device that manages the transfer of money value by value. Here, value is electronic information related to money value, and the electronic money system 1 transfers money value by increasing or decreasing the balance of value (hereinafter, a value balance).

In addition, a business entity of the electronic money system 1 relates the transfer of value to the transfer of actual money by transferring actual money in response to the transfer of value.

The electronic money server 2 stores the "server-side value balance" whose balance management is performed on the server's side.

On the other hand, the mobile terminal 5 stores the "terminal-side value balance" in the IC module 30 incorporated into or attached to the mobile terminal 5.

Although not necessarily required, the electronic money server 2 stores a management value of the terminal-side value balance in a state in which the management value is related to the mobile terminal 5 for management. It is preferable that the "terminal-side value balance" and the "management value of the terminal-side value" are the same value as a result of being always synchronized with each other. However, in actuality, there are a large number of asynchronous payment terminals 7 that cannot establish real-time connection to the electronic money server 2. Therefore, the generated log data is sent to the electronic money server 2 later by batch processing to make them in synchronism with each other ex post facto.

The mobile terminal 5 is a mobile terminal formed as, for example, a smartphone, a mobile telephone, a game console, a tablet computer, or the like and has the function of connecting to the Internet 3 and the function of connecting to the synchronous-type payment terminal 6 and the asynchronous payment terminal 7 by short-distance radio communication.

The mobile terminal 5 has the IC module 30 incorporated thereinto or attached thereto and stores an electronic money number and the terminal-side value balance therein.

The synchronous-type payment terminal 6 performs short-distance radio communication with the mobile terminal 5 and also performs communication with the electronic money server 2 via the communication line 8, thereby sending information such as a payment amount to the electronic money server 2 and relaying the communication between the electronic money server 2 and the mobile terminal 5. The synchronous-type payment terminal 6 is a synchronous payment terminal that performs online communication with the electronic money server 2 in real time at the time of payment using the mobile terminal 5. The synchronous-type payment terminal 6 handles at least one of payment using the terminal-side value balance and payment using the server-side value balance.

The synchronous-type payment terminal 6 is installed in an accounting counter, an automatic vending machine, or the like of a real existing store (a real existing store that is physically open in a real estate store or the like) such as a convenience store.

The communication line 8 is a line that connects the electronic money server 2 with the synchronous-type payment terminal 6 or the asynchronous payment terminal 7. As the communication line 8, a dedicated line can be used, and a general-purpose line such as the Internet 3 may also be used.

The asynchronous payment terminal 7 is installed in, for example, a store and an automatic vending machine with inconvenient network equipment and has the function of performing short-distance radio communication with the mobile terminal 5.

The asynchronous payment terminal 7 performs payment by using the terminal-side value balance by performing short-distance radio communication with the mobile terminal 5. The asynchronous payment terminal 7 is usually not connected to the electronic money server 2 (therefore cannot perform payment by using server-type electronic money) and temporarily stores the details of payment performed between the asynchronous payment terminal 7 and the mobile terminal 5 as log data.

Then, the asynchronous payment terminal 7 connects to the electronic money server 2 around once a day, for example, by using the communication line 8 and sends the log data to the electronic money server 2. In an environment with no network communication equipment, a person in charge sometimes manually collects a recording medium on which the log data is recorded.

As for the terminal-side value balance, the electronic money server 2 manages the fund transfer based on the history of real-time access to the IC module 30 via the synchronous-type payment terminal 6 and the log data which is sent from the asynchronous payment terminal 7.

The asynchronous payment terminal 7 includes the speaker 145 and can emit an ultrasonic wave when necessary. The mobile terminal 5 is configured to be capable of receiving this ultrasonic wave with the microphone 20.

Figure 2:
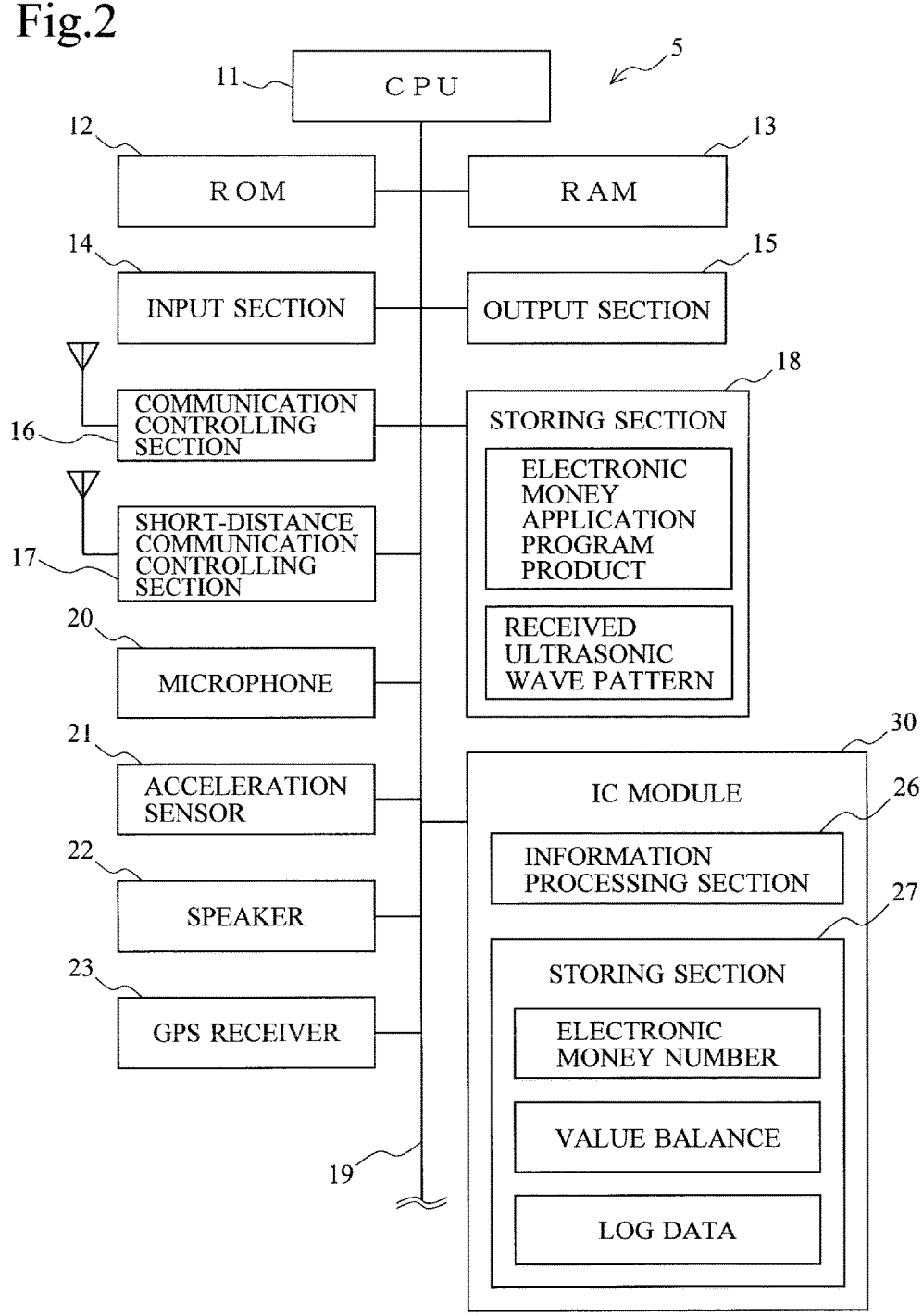
FIG. 2 is a diagram for explaining the configuration of a mobile terminal.

FIG. 2 is a diagram depicting the hardware configuration of the mobile terminal 5. Here, as an example, it is assumed that the mobile terminal 5 is a smartphone, but the same goes for a mobile telephone.

The game console and the tablet computer usually do not have the function of performing radio communication with a base station antenna of a mobile telephone network and often have only the function of performing radio communication with an access point of a wireless LAN. Incidentally, there are models of smartphones also having the function of performing radio communication with the access point of the wireless LAN.

The mobile terminal 5 is formed of a CPU (Central Processing Unit) 11, ROM (Read Only Memory) 12, RAM (Random Access Memory) 13, an input section 14, an output section 15, a communication controlling section 16, a short-distance communication controlling section 17, a storing section 18, the microphone 20, an acceleration sensor 21, a speaker 22, a GPS receiver 23, the IC module 30, and so forth which are connected to one another by a bus line 19.

The CPU 11 performs various kinds of information processing and overall control of the mobile terminal 5 by executing a program product recorded on the ROM 12 and the storing section 18. In this embodiment, for example, the CPU 11 supports payment processing using the value balance by cooperating with the electronic money server 2 by the function provided by an electronic money application program product which will be described later.

The ROM 12 is read-only memory, and a basic program product used by the mobile terminal 5 to operate, a parameter, data, and so forth are recorded thereon.

The RAM 13 is readable/writable memory and offers working memory used when the CPU 11 performs information processing.

The output section 15 is a functional section that outputs information to the user and is provided with a liquid crystal display for screen display, a speaker from which sound is output, and so forth. On the liquid crystal display, for example, an icon for starting the electronic money application program product is displayed.

The input section 14 is a functional section that inputs information from the outside and is provided with, for example, a touch panel installed on the liquid crystal display. By touching the touch panel in response to the display on the liquid crystal display, the user can enter information.

The storing section 18 is formed by using, for example, a recording medium such as an EEPROM (Electrically Erasable and Programmable ROM) and a hard disk, and an OS (Operating System) which is a basic program product that controls the mobile terminal 5, the electronic money application program product that supports payment by value, a received ultrasonic wave pattern which will be described later, and other program products and data are recorded thereon.

The communication controlling section 16 includes an antenna for performing radio communication with the base station antenna of the mobile telephone network and connects the mobile terminal 5 to the Internet 3 or a telephone line. The mobile terminal 5 can perform communication with the electronic money server 2 through the communication controlling section 16 via the Internet 3.

Moreover, the smartphone also has the function of performing radio communication with the access point of the wireless LAN.

The short-distance communication controlling section 17 includes an antenna for performing short-distance radio communication with reader/writers of the synchronous-type payment terminal 6 and the asynchronous payment terminal 7 and connects the IC module 30 to the synchronous-type payment terminal 6 or the asynchronous payment terminal 7. In addition to performing communication with the synchronous-type payment terminal 6 or the asynchronous payment terminal 7 via the short-distance communication controlling section 17, the IC module 30 can perform communication with the electronic money server 2 via the communication controlling section 16 of the mobile terminal 5.

The speaker 22 functions to inform the user of something by producing sound. In this embodiment, as will be described later, the speaker 22 outputs a warning tone when the amount of the value balance is small.

The IC module 30 is an IC module that stores a general-purpose application and is incorporated into or attached to the mobile terminal 5. It is possible to make the IC module 30 store the application downloaded by the user.

The IC module 30 is formed of a CPU, RAM, ROM, and so forth and is provided with an information processing section 26 that performs information processing in accordance with various program products and a storing section 27 formed of nonvolatile memory.

In the storing section 27, an electronic money number and the terminal-side value balance and, though not depicted in the drawing, a value operation program product used by the information processing section 26 to operate the value balance, authentication data used by the electronic money server 2 to authenticate the IC module 30, and so forth are stored. Moreover, the log data of payment and recharging is also stored.

The electronic money number is a number used by the electronic money server 2 to identify the user of the mobile terminal 5 (the IC module 30).

Reduction processing and increase processing related to the terminal-side value balance in the IC module 30 are performed by the value operation program product formed in the information processing section 26 in the IC module 30 in accordance with an instruction from the outside. This is performed in order to increase security by limiting processing of the value balance to the inside of the IC module 30.

Incidentally, as for processing of the terminal-side value balance, information to be input to the IC module 30 is encrypted and is decoded in the IC module 30, and the information to be output from the IC module 30 is output after being encrypted in these modules.

The microphone 20 receives sound from the outside and converts the sound into an electrical signal. In this embodiment, the microphone 20 detects an ultrasonic wave which is output from the speaker 145 of the asynchronous payment terminal 7.

Since the ultrasonic wave is a sound wave in a non-audible range and the attenuation rate thereof is high, the microphone 20 is desirably a high-precision microphone. In some cases, an ultrasonic sensor may be used. Moreover, the ultrasonic wave received by this microphone 20 may be amplified by an amplifier or the like.

The acceleration sensor 21 is an inertial sensor intended for measurement of the acceleration. By measuring the acceleration and performing signal processing, the acceleration sensor 21 can obtain various information such as the inclination, movement, and vibrations of the mobile terminal 5, the impact on the mobile terminal 5, and so forth.

The GPS receiver 23 can measure the current position of the mobile terminal 5 by receiving radio waves from a plurality of GPS satellites and calculating the distance from each GPS satellite.

Figure 3:
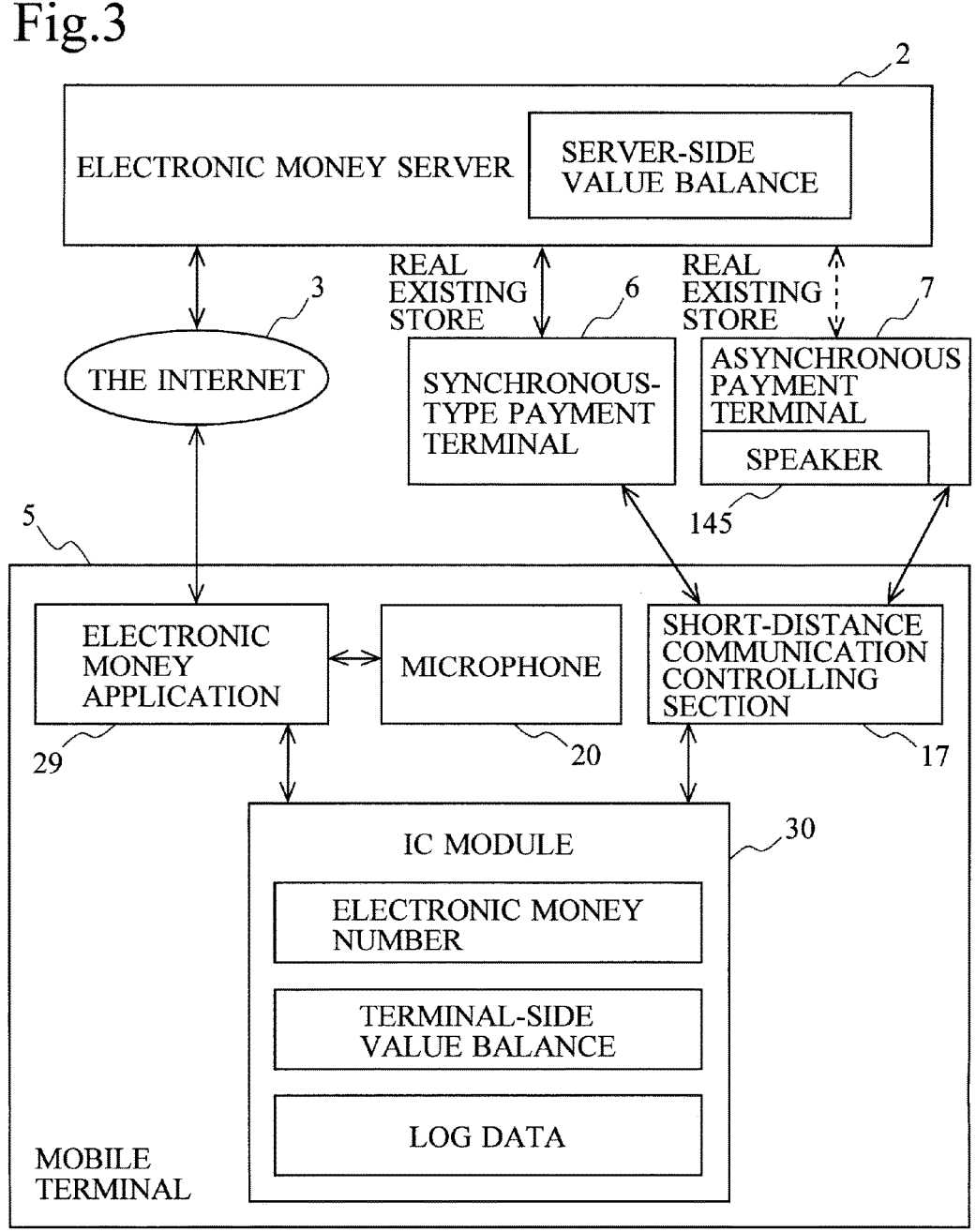
FIG. 3 is a diagram for explaining the function of the mobile terminal.

FIG. 3 is a diagram for explaining the function of the mobile terminal 5.

When the electronic money application program product is executed, an electronic money application 29 is formed in the mobile terminal 5.

In the case of payment in a real existing store provided with the synchronous-type payment terminal 6, the short-distance communication controlling section 17 performs communication with the synchronous-type payment terminal 6 and performs communication with the electronic money server 2 via the synchronous-type payment terminal 6. When payment is performed by using the server-side value, payment is performed by reducing the server-side value in real time.

In the case of payment in a real existing store provided with the asynchronous payment terminal 7, the short-distance communication controlling section 17 performs communication with the asynchronous payment terminal 7.

Moreover, the electronic money application 29 can access the IC module 30.

In the case of payment in a real existing store, the short-distance communication controlling section 17 can increase or decrease the terminal-side value balance and read the electronic money number by operating the value operation program product in the IC module 30.

Then, when payment processing is performed, the IC module 30 receives, via the short-distance communication controlling section 17, a request from the asynchronous payment terminal 7 to update (reduce) the value balance and updates (reduces) the terminal-side value balance.

As the terminal-side value balance update processing that is performed here, the following methods are possible.

(Method 1) A case where an overwriting instruction is sent as a terminal-side value balance update request.

In this case, the electronic money server 2 subtracts a payment amount from the terminal-side value balance received from the CPU of the IC module 30 of the mobile terminal 5 and calculates the balance after subtraction. Then, the asynchronous payment terminal 7 sends, as a terminal-side value balance update request, an overwriting instruction by which overwriting is performed on the balance after calculation. The CPU of the IC module 30 of the mobile terminal 5 performs update by performing overwriting with the terminal-side value balance in accordance with the overwriting instruction.

(Method 2) A case where a subtraction instruction is sent as the terminal-side value balance update request.

In this case, the asynchronous payment terminal 7 sends a subtraction instruction by which a payment amount is subtracted from the value balance to the CPU of the IC module 30 of the mobile terminal 5 as the terminal-side value balance update request. The CPU of the IC module 30 of the mobile terminal 5 updates the terminal-side value balance by subtracting the payment amount from the terminal-side value balance in accordance with the instruction.

Then, the IC module 30 informs the asynchronous payment terminal 7 of the update of the terminal-side value balance.

Next, recharging which is performed in a real existing store will be described.

This recharging is based on the premise that a store clerk who operates the asynchronous payment terminal 7 has received money corresponding to value by which recharging is performed. Then, when recharging processing is performed, the IC module 30 receives, via the short-distance communication controlling section 17, a request from the asynchronous payment terminal 7 to update (increase) the terminal-side value balance and updates (increases) the terminal-side value balance.

Then, the IC module 30 informs the asynchronous payment terminal 7 of the update of the terminal-side value balance.

In this recharging, recharging can also be performed directly from the electronic money server 2 without the asynchronous payment terminal 7. In this case, access is made to the electronic money server 2 via the communication controlling section 16 of the mobile terminal 5, and the procedures such as user authentication processing, permission from an authentication organization server such as a credit company server 300, and so forth are executed. Then, the mobile terminal 5 receives amount change (increase) information from the electronic money server 2, and the IC module 30 updates (increases) the terminal-side value balance.

Figure 4:
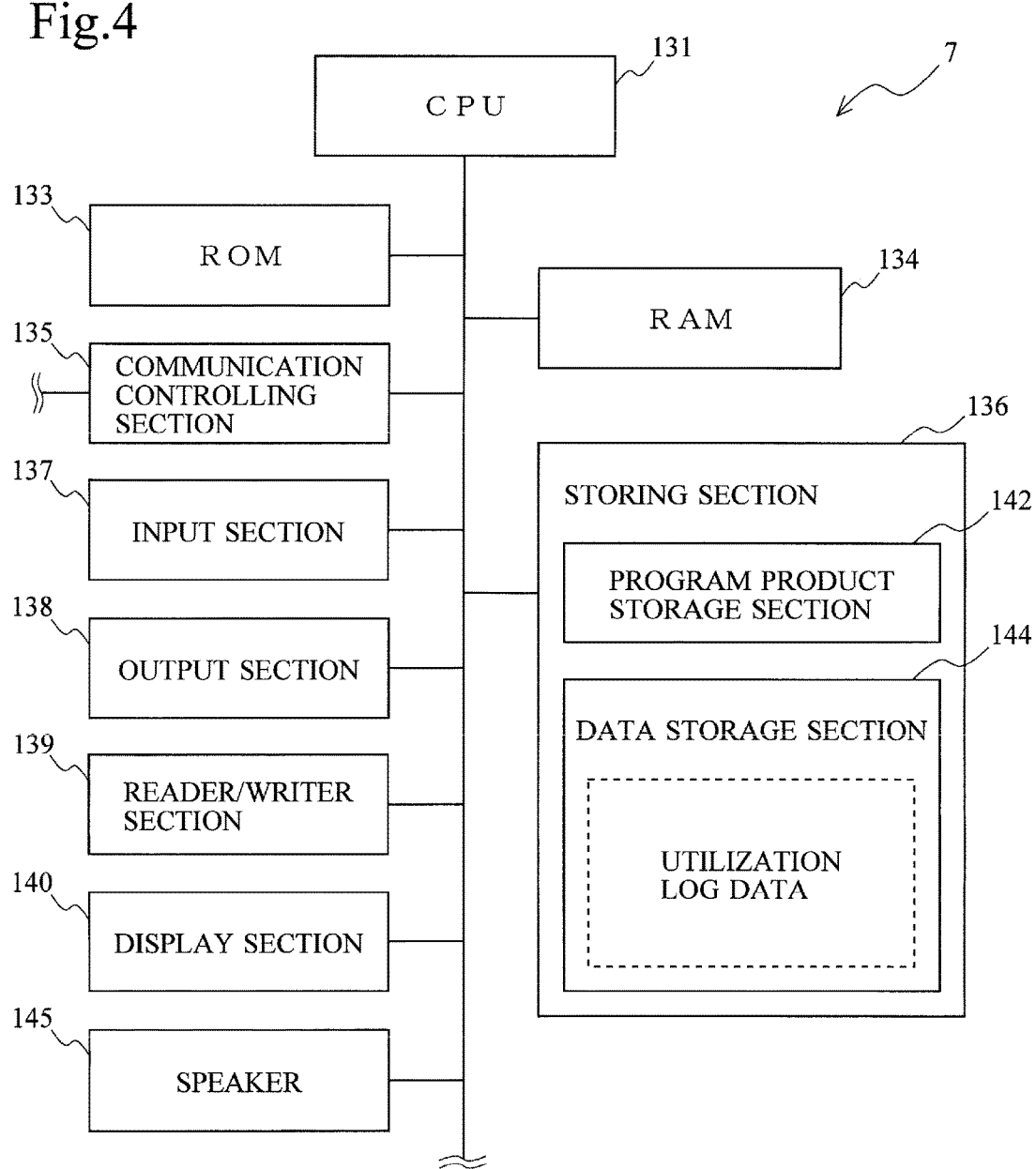
FIG. 4 is a diagram for explaining the configuration of an asynchronous payment terminal.

FIG. 4 is a diagram depicting an example of the hardware configuration of the asynchronous payment terminal 7.

The asynchronous payment terminal 7 is formed of a CPU 131, ROM 133, RAM 134, a communication controlling section 135, a storing section 136, an input section 137, an output section 138, a reader/writer section 139, a display section 140, the speaker 145, and so forth which are connected to one another by a bus line and has the function as a payment processing device.

In addition to performing information processing in accordance with a predetermined program product, the CPU 131 performs, for example, overall control of the asynchronous payment terminal 7. In this embodiment, the CPU 131 sends amount change information to the IC module 30 of the mobile terminal 5 to make the IC module 30 perform amount change processing.

The ROM 133 is read-only memory storing a basic program product for making the asynchronous payment terminal 7 operate, a parameter, and so forth.

The RAM 134 is memory on which writing and reading can be performed at any time, the memory that offers working memory of the CPU 131 and loads the program product and the data stored in the storing section 136 and stores the program product and the data.

The communication controlling section 135 is a connection device that connects the asynchronous payment terminal 7 to the electronic money server 2 via a network.

If the asynchronous payment terminal 7 is the asynchronous payment terminal 7 installed in a store, the input section 137 is provided with an input device such as a keyboard and a barcode reader, for example, such that an operator can enter a product code, a payment amount, a recharging amount, and so forth.

Moreover, if the asynchronous payment terminal 7 is the asynchronous payment terminal 7 installed in a pass gate, the input section 137 is connected to a control device of the pass gate, for example, and accepts the input of the payment amount from the control device of the pass gate.

If the asynchronous payment terminal 7 is the asynchronous payment terminal 7 installed in a store, the output section 138 is connected to, for example, the display section 140 of a liquid crystal display device or the like, a printer, the speaker 145 that outputs sound, and so forth and presents information to a customer or an operator of a member store.

Moreover, if the asynchronous payment terminal 7 is the asynchronous payment terminal 7 installed in a pass gate, for example, the output section 138 is connected to a drive unit that drives a gate door and a warning lamp, an audio output device, and the like which are installed in the pass gate, and opens and closes the gate door and makes the warning lamp flash or produces a warning tone in synchronism with the opening and closing of the gate door.

The reader/writer section 139 incorporates an antenna and performs radio communication with the IC module 30 incorporated into or attached to the mobile terminal 5.

If the asynchronous payment terminal 7 is the asynchronous payment terminal 7 installed in a store, the reader/writer section 139 is installed near an unillustrated cash register (a higher-level terminal), such that the user can bring the mobile terminal 5 or the electronic money card 100 closer to the reader/writer section 139 when paying for a product.

Moreover, if the asynchronous payment terminal 7 is the asynchronous payment terminal 7 installed in a pass gate, the reader/writer section 139 is installed on the top face of the pass gate in a position closer to the front than a gate door, such that the user can bring the mobile terminal 5 or the electronic money card 100 closer to the reader/writer section 139 when passing through the pass gate.

The storing section 136 is formed of, for example, a hard disk or other storage media and a drive unit that drives them, and is formed of a program product storage section 142 that stores various program products, a data storage section 144 that stores data, and so forth.

In the program product storage section 142, an OS that is a basic program product for making the asynchronous payment terminal 7 function, a program product for making the electronic money card 100 perform amount change processing and making the electronic money server 2 perform recharging to add an amount corresponding to a shortfall, and so forth are stored.

In the data storage section 144, a terminal ID which is ID information of the asynchronous payment terminal 7, utilization log data which is the history of transactions with the IC module 30, and so forth are stored. This utilization log data is sent to the electronic money server 2 at regular or irregular intervals by batch processing that is performed by the CPU 131.

The display section 140 displays a payment amount, a pre-payment balance, a post-payment balance, an amount corresponding to a shortfall when payment is impossible, and so forth on the liquid crystal display device, for example. Moreover, in this embodiment, every time the price of each product at the time of payment processing is input, the display section 140 displays the cumulative price thereof.

The speaker 145 informs the user of a payment sound, a sound indicating that payment is impossible, audio guidance, or the like which is output from the output section 138. Here, the audio guidance is guidance for the user, such as "Payment cannot be performed due to a shortage of the balance." or "This electronic money card cannot be accepted."

Moreover, the speaker 145 outputs an ultrasonic wave.

Here, the ultrasonic wave is assumed to be a sound wave whose number of frequency (frequency) is 20,000 Hz or more per second, the sound wave inaudible to the ear as stationary sound, and is not perceived by the user or store clerk. Therefore, the ultrasonic wave does not give the visitor and the store clerk a feeling of discomfort.

The speaker 145 continuously outputs the ultrasonic wave. The ultrasonic wave which is output may repeat on/off in a fixed or variable time slot. Likewise, a change of the frequency thereof may be repeated in a fixed or variable time slot.

Moreover, over this ultrasonic wave, for example, the speaker 145 outputs an ID by which the asynchronous payment terminal 7 is identified or outputs the information (the price of each product, a cumulative payment price (a temporary payment amount), or the like) acquired by the higher-level terminal.

Figure 5:
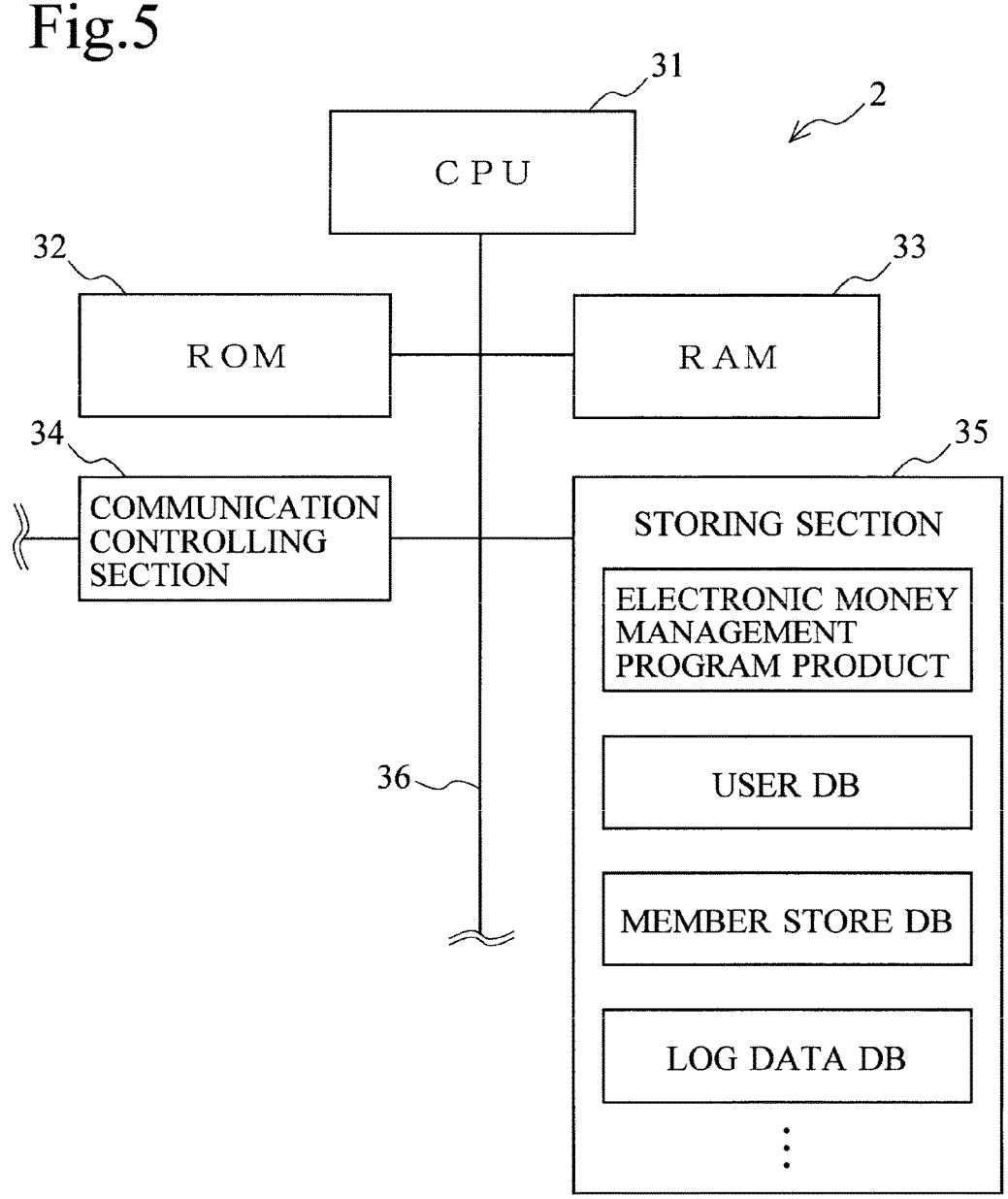
FIG. 5 is a diagram for explaining the configuration of an electronic money server.

FIG. 5 is a diagram for explaining the configuration of the electronic money server 2.

The electronic money server 2 is formed of a CPU 31, ROM 32, RAM 33, a communication controlling section 34, the storing section 35, and so forth which are connected to one another by a bus line 36.

The CPU 31 performs various kinds of information processing and overall control of the electronic money server 2 by executing the program product stored in the ROM 32 or the storing section 35. For example, the CPU 31 receives a recharging request from the mobile terminal 5 and performs recharging.

In payment with the asynchronous payment terminal 7, the electronic money server 2 processes the payment by receiving, from the asynchronous payment terminal 7 at a later time, the log data of the update of the value balance performed by the asynchronous payment terminal 7.

Incidentally, in the case of the synchronous-type payment terminal 6 that can be connected to the electronic money server 2 online, it is possible to perform payment processing by value by updating the server-side value balance in real time while performing communication.

The ROM 32 is read-only memory, and a basic program product used by the electronic money server 2 to operate, a parameter, data, and so forth are recorded thereon.

The RAM 33 is readable/writable memory and offers working memory used when the CPU 31 performs information processing.

With the communication controlling section 34, the electronic money server 2 performs communication with the synchronous-type payment terminal 6, the asynchronous payment terminal 7, and the mobile terminal 5 via the communication line 8 and performs communication with the mobile terminal 5 via the Internet 3.

The storing section 35 is formed of, for example, a large-capacity hard disk, and an electronic money management program product and other program products which are used by the CPU 31 to perform payment processing by value and perform recharging, a user DB (database) managing a user's server-side value balance and the history of recharging, a member store DB managing value payment performed in a member store, a log data DB storing log data which is a record of each payment processing, and so forth are recorded thereon.

Incidentally, in this example of FIG. 5, a single electronic money server 2 has been described, but this electronic money server 2 may be formed of a plurality of server devices by distributing the function.

Next, by using the drawings of FIG. 6, the databases of the electronic money server 2 will be described.

FIG. 6(a) is a diagram for explaining the logical configuration of the user DB.

In this embodiment, a server-side electronic money number and a terminal-side electronic money number are stored in a state in which the server-side electronic money number and the terminal-side electronic money number are related to a user ID. Though not depicted in the drawing, items such as authentication data of the IC module 30 are also stored. Incidentally, the server-side electronic money number and the terminal-side electronic money number may be managed as the same electronic money number.

An item "user ID" is user identification information.

An item "server-side electronic money number" is an account number for distinguishing a server-side value balance from the server-side value balances of other users.

An item "server-side value balance" is the server-side value balance of an account identified by the item "server-side electronic money number".

An item "terminal-side electronic money number" is a number for distinguishing a terminal-side value balance from the terminal-side value balances of other users.

An item "terminal-side value balance" is a management value of the terminal-side value balance identified by the item "terminal-side electronic money number". This value balance is updated by receiving the log data by batch processing. If this terminal-side value is used in the asynchronous payment terminal 7, since constant connection with the asynchronous payment terminal 7 is not established, the terminal-side value balance is not updated in real time. On the other hand, if the terminal-side value balance is used in the synchronous-type payment terminal 6, the terminal-side value balance is updated in real time.

FIG. 6(b) is a diagram for explaining the logical configuration of the member store DB.

The member store DB is formed of "member store ID", "synchronous-type payment terminal ID", "asynchronous payment terminal ID", and other items.

The item "member store ID" is information for identifying a business operator who gets payment service by electronic money, the payment service offered by the electronic money system 1.

The item "payment terminal ID" is information for identifying the synchronous-type payment terminal 6 of the member store.

The item "asynchronous payment terminal ID" is information for identifying the asynchronous payment terminal 7 of the member store.

Incidentally, if the member store is a virtual store, since the member store does not have the synchronous-type payment terminal 6 and the asynchronous payment terminal 7, in place of these terminal IDs, for example, information by which a virtual store server is identified, such as the IP address of the virtual store server, is used.

The synchronous-type payment terminal 6 and the asynchronous payment terminal 7 inform the electronic money server 2 of the synchronous-type payment terminal ID or the asynchronous payment terminal ID thereof when connecting thereto. As a result, the electronic money server 2 can identify the member store ID of the member store related to the fund transfer.

Incidentally, since a business operator generally installs a plurality of payment terminals in one store, a plurality of synchronous-type payment terminal IDs and a plurality of asynchronous payment terminal IDs are generally related to one member store ID.

Moreover, since the payment amount of a commercial transaction performed in the member store is recorded on the log data in a state in which the payment amount is related to the member store ID, the member store ID functions as an account number of the member store.

Next, a processing procedure of this embodiment will be described with reference to flowcharts of FIGS. 7 to 10.

Figure 7:
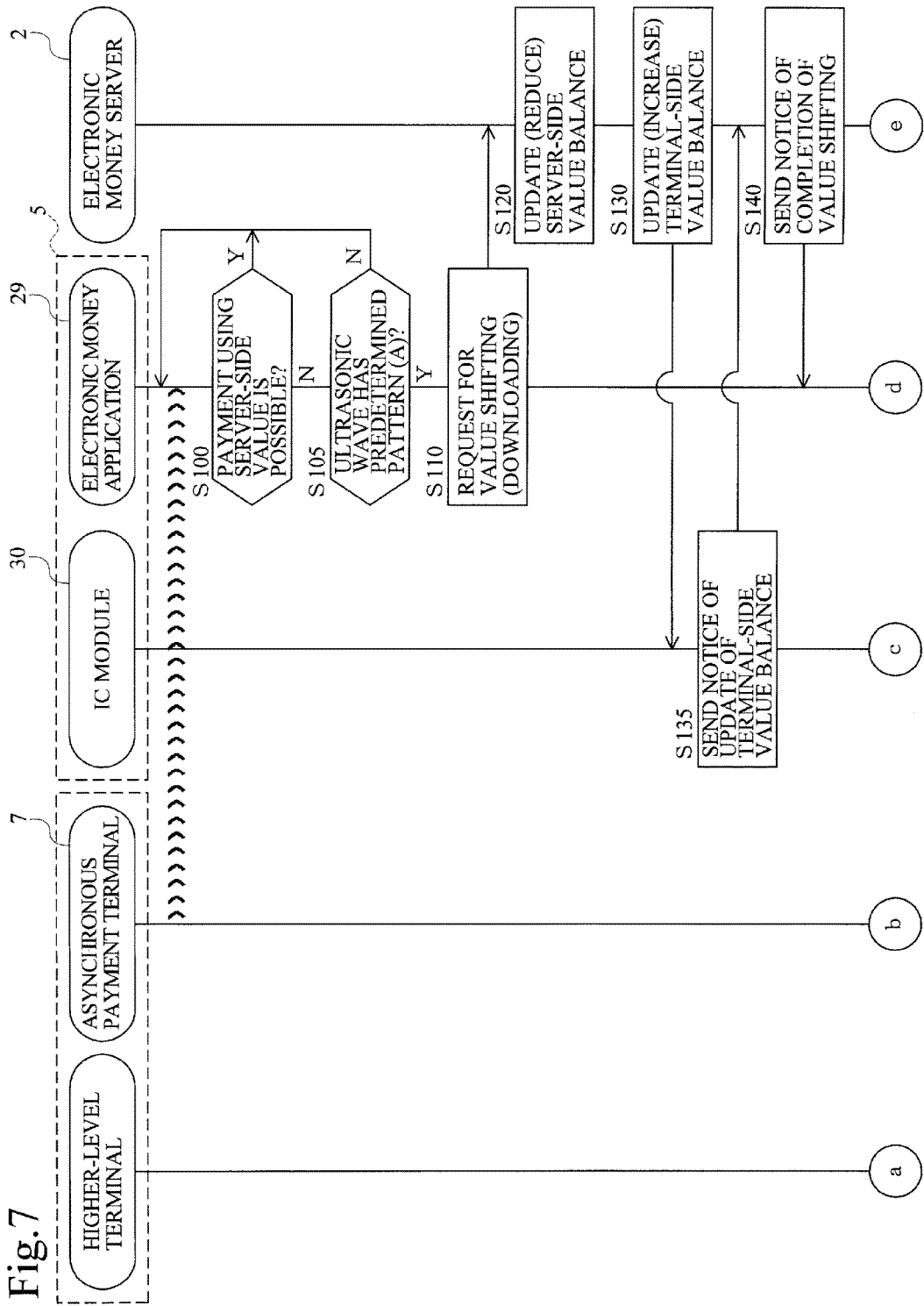
FIG. 7 is a flowchart depicting a processing procedure of this embodiment.

First, in FIG. 7, when the electronic money application 29 of the mobile terminal 5 approaches a store in which payment may be performed, the electronic money application 29 determines whether or not payment is possible at this store by using the server-side value (step 100). Specifically, if the microphone 20 is receiving an ultrasonic wave indicating that payment using the server-side value balance is impossible, the ultrasonic wave emitted from the asynchronous payment terminal 7, the electronic money application 29 determines that payment cannot be performed by using the server-side value (step 100; N).

Then, the electronic money application 29 determines whether or not a pattern indicated by the volume level of the ultrasonic wave which is being received coincides with a predetermined received ultrasonic wave pattern (an approach pattern) (step 105). This predetermined received ultrasonic wave pattern is stored in the storing section 18 of the mobile terminal 5 in advance. An example of this received ultrasonic wave pattern is depicted in (A) of FIG. 11. As described above, it is determined whether or not the mobile terminal 5 (that is, the user) is gradually approaching a sound source (the asynchronous payment terminal 7) of the ultrasonic wave based on an increase and decrease of the volume level which is being received.

As a result, if it is determined that the pattern indicated by the ultrasonic wave which is being received coincides with the predetermined received ultrasonic wave pattern (step 105; Y), since the mobile terminal 5 is approaching the asynchronous payment terminal 7, the electronic money application 29 requests the electronic money server 2 to shift (download) the server-side value by using the communication function of the mobile terminal 5 (step 110).

Incidentally, in the case of (step 100; Y) or (step 105; N), the electronic money application 29 does not make a request for value shifting (downloading).

At this time, the electronic money server 2 first reduces an amount corresponding to value to be shifted from the server-side value balance (step 120). At this time, the electronic money server 2 may shift all of the server-side value balance or may shift value corresponding to a predetermined amount, for example, an amount corresponding to 5,000 yen or 10,000 yen depending on the setting. Moreover, the electronic money server 2 may shift value to a prescribed terminal's side limit, for example, 20,000 yen or 50,000 yen. In addition to those described above, the electronic money server 2 may lock a portion of the server-side value balance, the portion corresponding to an amount of value to be shifted, such that it cannot be used. In either case, value to be shifted is prevented from becoming usable on both the terminal's side and the server's side.

Next, the electronic money server 2 generates amount change information for increasing the terminal-side balance by an amount corresponding the portion of the server-side value balance, the portion which is made unusable, and sends the amount change information to the IC module 30 via the mobile terminal 5 (step 130). After updating (increasing) the terminal-side value balance, the IC module 30 sends a notice to the effect that the update of the terminal-side value balance has been completed to the electronic money server 2 (step 135). In response to this, the electronic money server 2 sends a notice to the effect that value shifting has been completed to the electronic money application 29 and ends a series of processing of value shifting.

Figure 8:
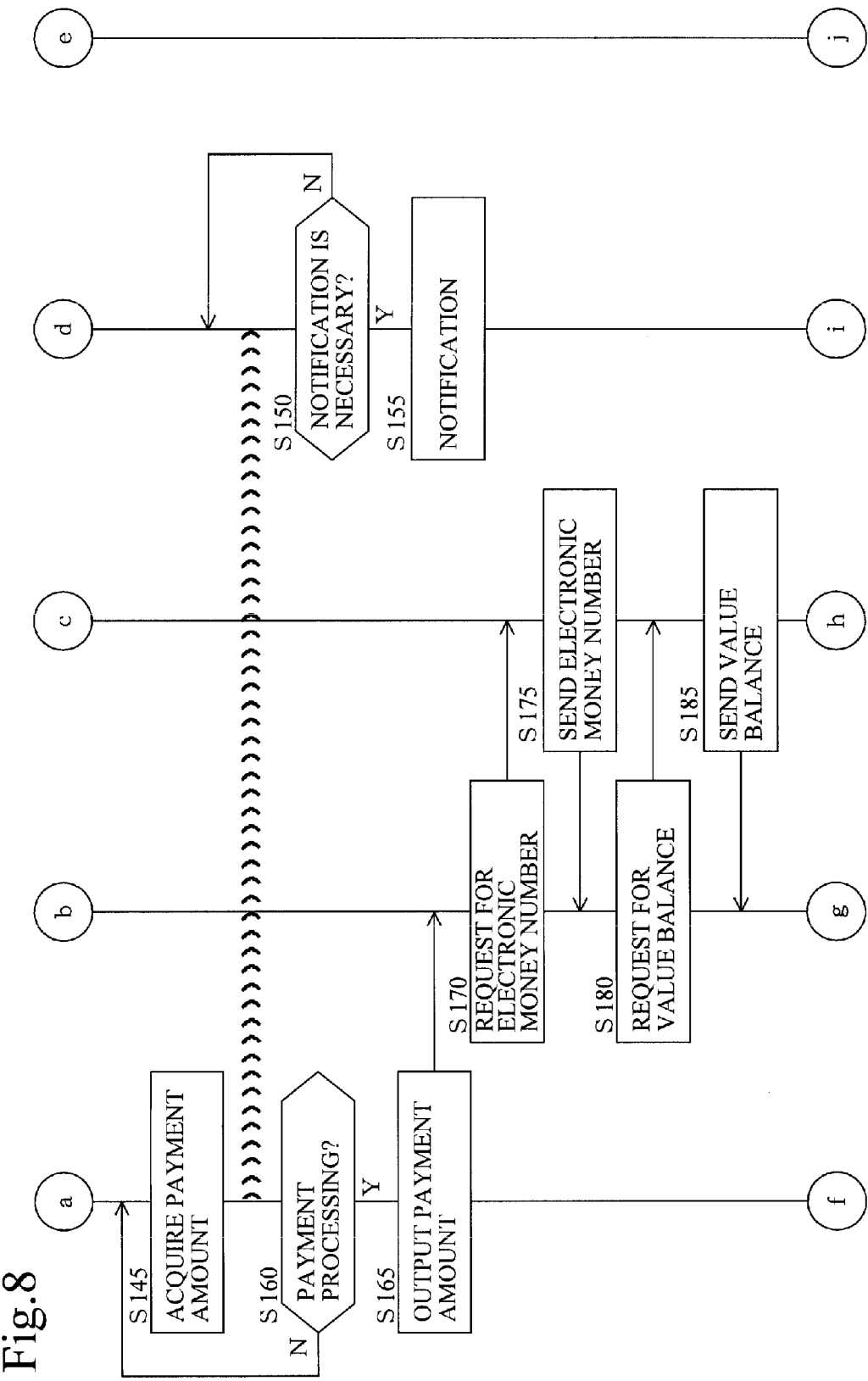
FIG. 8 is a flowchart depicting the processing procedure of this embodiment.

Next, in FIG. 8, by using the shifted value, processing of payment with the asynchronous payment terminal 7 will be described.

Figure 12:
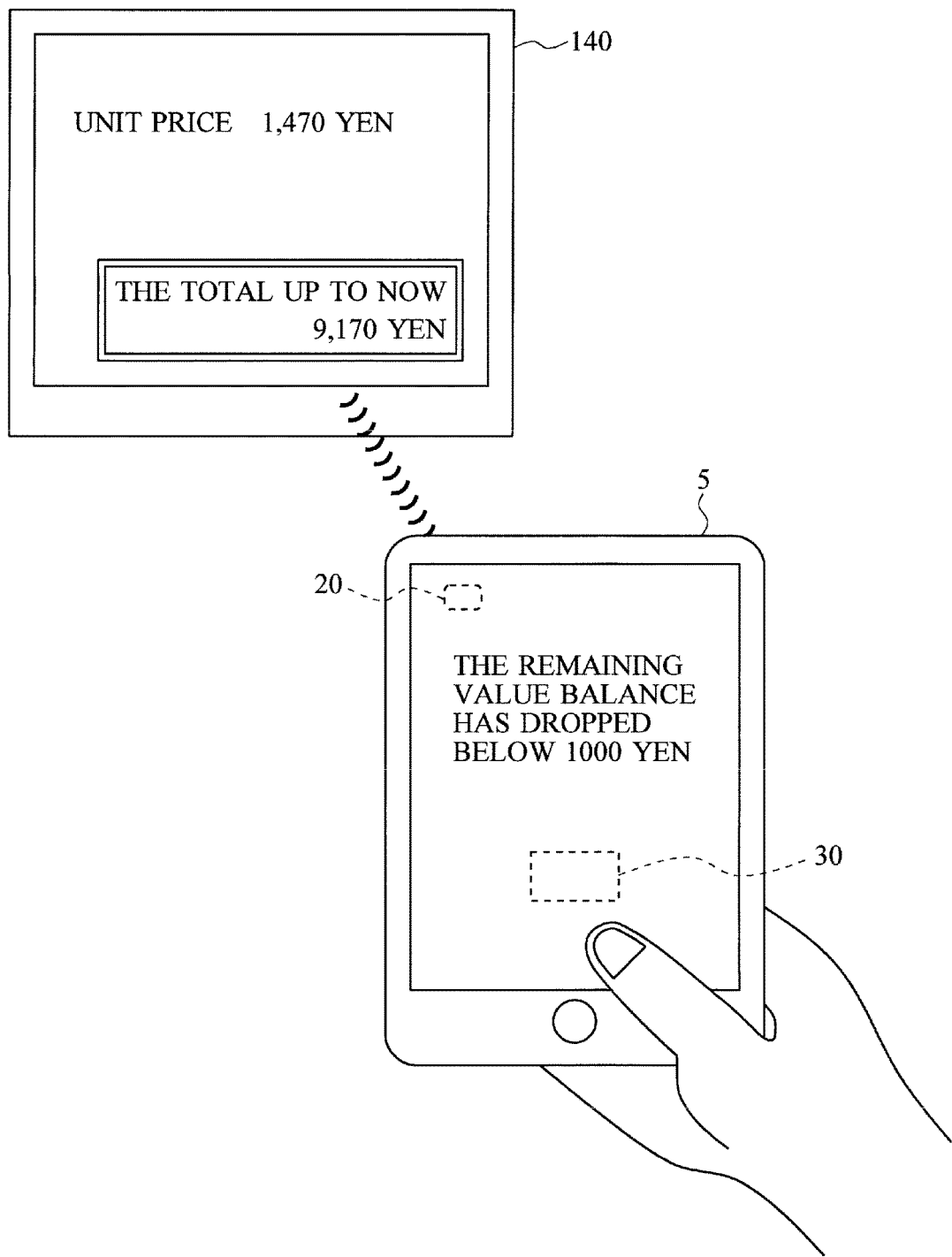
FIG. 12 is a diagram depicting an example of a display section of the asynchronous payment terminal displaying a cumulative payment price.
Figure 13:
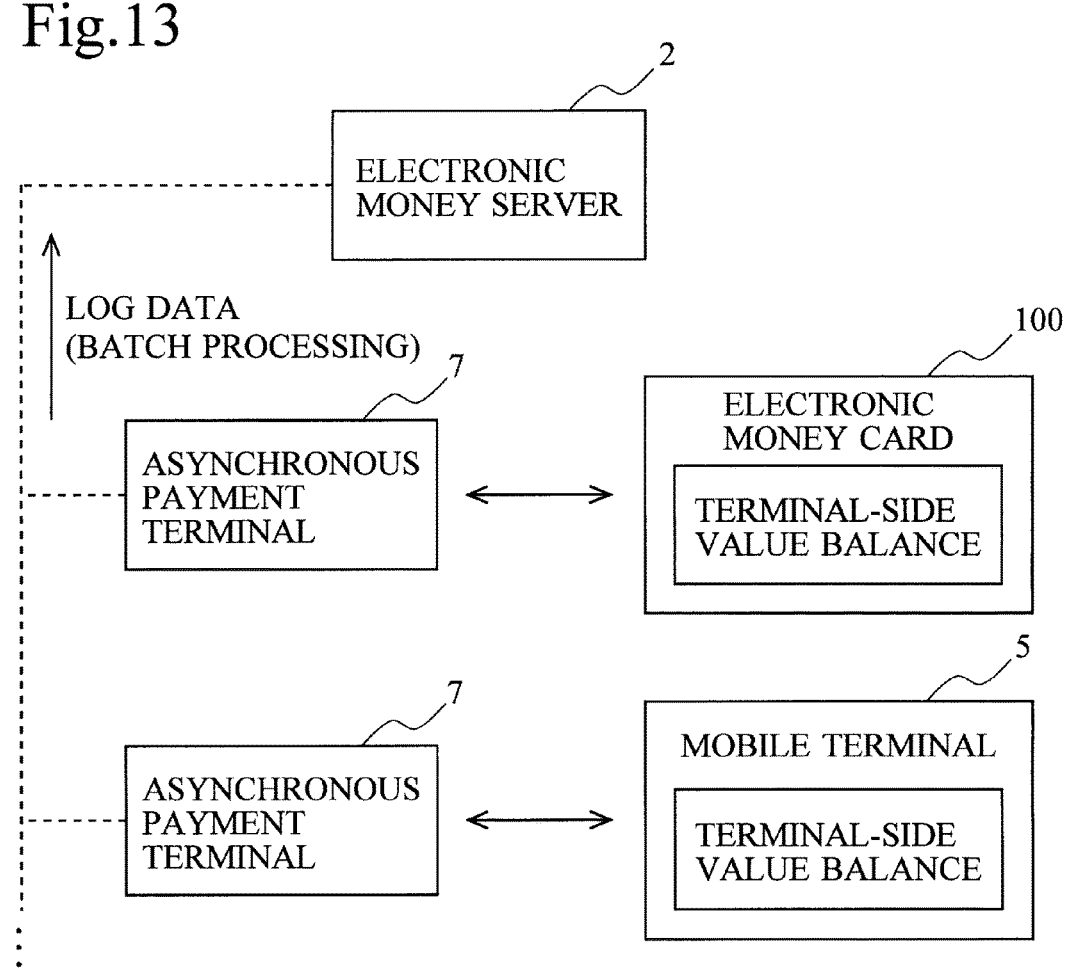
FIG. 13 is a diagram for explaining an existing electronic money system.

When the user purchases a product in a member store, a higher-level terminal (for example, a cash register or a POS register) integrated with the asynchronous payment terminal 7 acquires a payment amount based on the input from a store clerk or a barcode (step 145). As this time, if a plurality of products are purchased, the price of each product is input and, every time the price is input, the latest total price (the temporary payment amount) is displayed on the display section 140 of the asynchronous payment terminal 7 as depicted in FIG. 12. The user can recognize how much money he/she needs for payment while checking this temporary payment amount.

In this embodiment, the higher-level terminal successively sends this temporary payment amount from the speaker 145 over the ultrasonic wave. The mobile terminal 5 receives this ultrasonic wave with the microphone 20.

The electronic money application 29 compares the received temporary payment amount with the terminal-side value balance. Then, the electronic money application 29 determines whether or not the temporary payment amount exceeds the terminal-side value balance or whether or not the temporary payment amount exceeds a predetermined value (for example, the remaining 1,000 yen or 500 yen).

As a result, if the temporary payment amount exceeds the terminal-side value balance or exceeds the predetermined value, the electronic money application 29 determines that a notification to the user is necessary (step 150; Y) and sends out data providing a notification (step 155).

As a method of this notification, a message saying "The payment amount has exceeded the value balance." or "The value balance is running low." is output from the speaker 22 of the mobile terminal 5 by voice. Moreover, as another method, a warning such as "value balance shortage" or "the value balance is running low" is displayed on the output section 15 of the mobile terminal 5.

In FIG. 12, an example in which "the remaining value balance has dropped below 1,000 yen" is displayed on the mobile terminal 5 is depicted.

Furthermore, a notification may be provided to the user by making an LED flash or vibrating the mobile terminal 5 itself.

The user who has received the notification may ask the store clerk to suspend the payment at that stage or ask the store clerk to accept payment by cash.

The higher-level terminal successively acquires the prices of the products and, when the higher-level terminal acquires the prices of all the products, payment processing becomes possible (step 160; Y), and the higher-level terminal outputs the total payment amount to the asynchronous payment terminal 7 (step 165). At the same time, the higher-level terminal displays the total payment amount on the display section 140.

Here, the user passes the mobile terminal 5 over the reader/writer section 139 in order to perform payment by electronic money.

First, the reader/writer section 139 requests the electronic money number from the IC module 30 (step 170). In response to this, the IC module 30 sends the electronic money number to the reader/writer section 139 (step 175).

Next, the reader/writer section 139 requests the terminal-side value balance from the IC module 30 (step 180). In response to this, the IC module 30 sends the terminal-side value balance (if the value is shifted from the electronic money server, the terminal-side value balance that reflects the shift processing) to the reader/writer section 139 (step 185).

Figure 9:
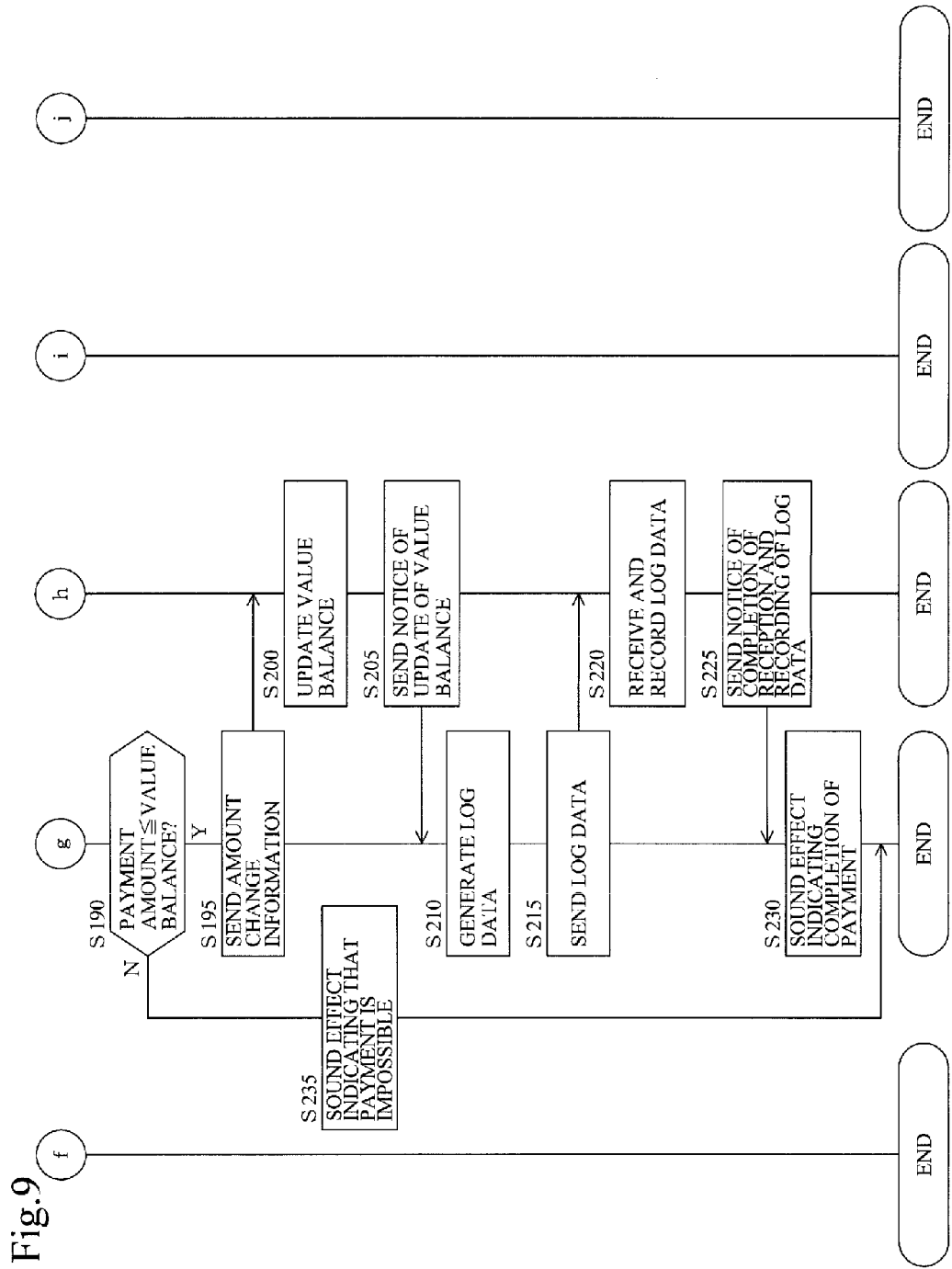
FIG. 9 is a flowchart depicting the processing procedure of this embodiment.

In FIG. 9, the asynchronous payment terminal 7 compares the output payment amount with the sent terminal-side value balance and thereby determines whether or not the terminal-side value balance is more than or equal to the payment amount (step 190). If the terminal-side value balance is more than or equal to the payment amount (step 190; Y), since payment is possible, the asynchronous payment terminal 7 performs payment processing. Then, the asynchronous payment terminal 7 sends amount change information corresponding to the payment amount to the IC module 30 (step 195). In response to this, the IC module 30 updates (reduces) the terminal-side value balance (step 200) and sends a notice to the effect that the terminal-side value balance has been updated to the asynchronous payment terminal 7 (step 205).

In response to this, the asynchronous payment terminal 7 generates log data (step 210) and sends the generated log data to the IC module 30 (step 215). The IC module 30 records the received log data on the storing section 27 (step 220). Then, the IC module 30 sends a notice to the effect that reception and recording of the log data has been completed to the asynchronous payment terminal 7 (step 225).

Then, the asynchronous payment terminal 7 plays a sound effect indicating the completion of payment for informing the user of the successful completion of a series of processing and ends the processing (step 230).

On the other hand, if it is determined in step 190 that the terminal-side value balance is less than the payment amount (step 190; N), since payment is impossible due to a shortage of the terminal-side value balance, the asynchronous payment terminal 7 informs the user of it by playing a sound effect indicating that payment is impossible (step 235) and ends the processing.

Next, with reference to FIG. 10, processing by which the downloaded value is uploaded to the electronic money server 2 will be described.

In the processing depicted in FIG. 7, the value temporarily shifted to the mobile terminal 5 is sometimes used in payment and is sometimes not used in payment. In this processing of FIG. 10, processing by which, irrespective of whether or not the downloaded value has been used, when the user moves away from the store in which the asynchronous payment terminal 7 is installed, the value temporarily downloaded to the side of the mobile terminal 5 is uploaded to the electronic money server 2 will be described.

Figure 10:
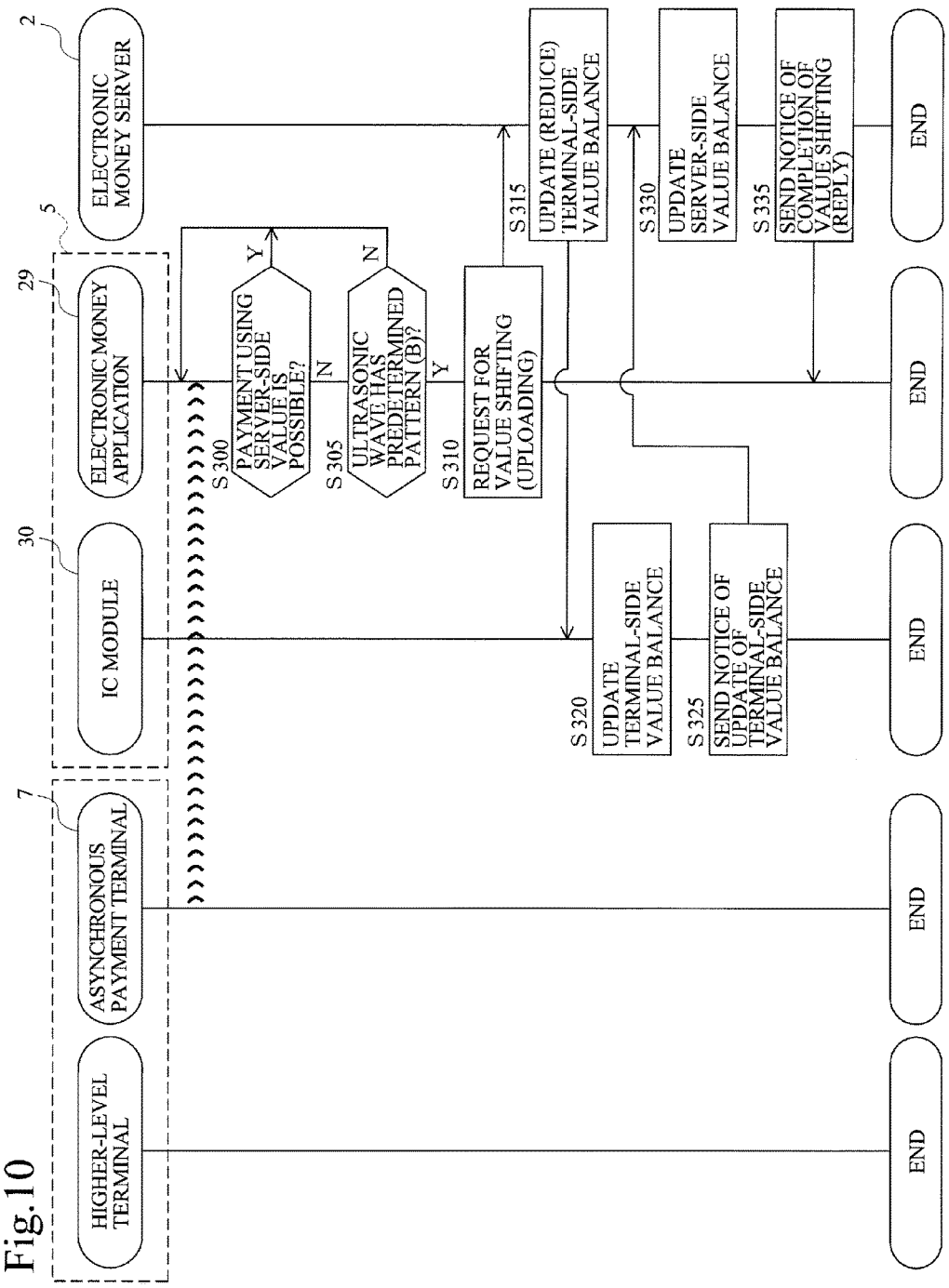
FIG. 10 is a flowchart depicting the processing procedure of this embodiment.

First, in FIG. 10, when the user moves away from the store, the electronic money application 29 determines whether or not payment is possible at this store by using the server-side value (step 300). Specifically, if the microphone 20 is receiving an ultrasonic wave indicating that payment using the server-side value balance is impossible, the ultrasonic wave emitted from the asynchronous payment terminal 7, the electronic money application 29 determines that payment cannot be performed by using the server-side value (step 100; N).

Then, the electronic money application 29 determines whether or not a pattern indicated by the volume level of the ultrasonic wave which is being received coincides with a predetermined received ultrasonic wave pattern (a moving-away pattern) (step 305). This predetermined received ultrasonic wave pattern is stored in the storing section 18 of the mobile terminal 5 in advance. An example of this received ultrasonic wave pattern is depicted in (B) of FIG. 11. As described above, the electronic money application 29 determines whether or not the mobile terminal 5 (that is, the user) is gradually moving away from the sound source (the asynchronous payment terminal 7) of the ultrasonic wave based on an increase and decrease of the volume level which is being received.

As a result, if it is determined that the pattern indicated by the ultrasonic wave which is being received coincides with the predetermined received ultrasonic wave pattern (step 305; Y), since the mobile terminal 5 is moving away from the asynchronous payment terminal 7, the electronic money application 29 requests the electronic money server 2 to shift (upload) the server-side value by using the communication function of the mobile terminal 5 (step 310).

Incidentally, in the case of (step 300; Y) or (step 305; N), the electronic money application 29 does not make a request for value shifting (uploading).

At this time, the electronic money server 2 first generates amount change information for reducing the terminal-side balance by an amount corresponding to value to be shifted and sends the amount change information to the IC module 30 via the mobile terminal 5 (step 315).

At this time, of the value shifted (downloaded) by the flow of FIG. 7, value obtained by subtracting the value used for payment therefrom may be uploaded or a fixed threshold value may be set to prevent the terminal-side value balance from becoming zero and an amount exceeding it may be uploaded. For example, assume that value corresponding to 20,000 yen was shifted and value corresponding to 5,000 yen was used. At this time, if a threshold value of 3,000 yen is set, value corresponding to 12,000 yen as a result of 15,000-3,000 yen is uploaded.

After updating (reducing) the terminal-side value balance (step 320), the IC module 30 sends a notice to the effect that the update of the terminal-side value balance has been completed to the electronic money server 2 (step 325).

Then, the electronic money server 2 updates (increases) the server-side value balance by an amount corresponding to the amount reduced from the terminal-side value balance (step 330). If the server-side value balance is locked, the lock is released by an amount corresponding to the amount reduced from the terminal-side value balance.

Then, the electronic money server 2 sends a notice to the effect that value shifting (uploading) has been completed to the electronic money application 29 (step 330) and ends the processing.

As described above, by uploading the value downloaded to the IC module from the electronic money server 2 to the electronic money server 2 from the IC module 30, it is possible to reduce the risk which the user will assume when the mobile terminal 5 having the IC module 30 incorporated thereinto or attached thereto is lost, stolen, or the like.

Next, ON and OFF of the microphone 20 of the mobile terminal 5 will be described.

In this embodiment, the microphone 20 is used to obtain an ultrasonic wave, but leaving the microphone 20 in an ON state at all times is not desirable in terms of exhaustion of a battery. Therefore, it is desirable to turn on the microphone 20 when necessary and turn off the microphone 20 otherwise if possible.

First, a method using the GPS receiver 23 of the mobile terminal 5 is described.

The mobile terminal 5 according to this embodiment is provided with the GPS receiver 23. Therefore, the electronic money application 29 can grasp the current position by receiving the radio waves from a satellite.

On the other hand, by recording, on the storing section of the mobile terminal 5 in advance, the positional information of a member store in which the asynchronous payment terminal 7 is installed and checking the obtained positional information against the positional information of the member store, it is possible to detect that it is near the member store in which the asynchronous payment terminal 7 is installed. For example, control by which the microphone 20 is turned on when it is determined that it has reached an area within 10 meters of the member store is performed.

Moreover, a member store at which payment was performed with the asynchronous payment terminal 7 is recorded, and control by which the microphone 20 is turned on also when it has reached an area near the member store may also be performed.

Incidentally, by a similar method, it can also be configured such that, when it is determined that it has reached an area at a given distance from (for example, within 10 meters of) the member store in which the asynchronous payment terminal 7 is installed, shifting (downloading) of value is requested.

As another method, there is a method using the acceleration sensor 21 of the mobile terminal 5.

Since the acceleration sensor 21 can make detection as to how many centimeters the mobile terminal 5 has moved in a given amount of time, the value thereof, for example, 1 meter may be set, and the microphone 20 may be turned on if the mobile terminal 5 has moved 1 m or more in a given amount of time.

This is because, when the mobile terminal 5 is left at home or in the workplace, there is no possibility of payment and there is no need to turn on the microphone 20.

Next, a modified example of the above-described example in which a notification is provided to the user if the temporary payment amount does not exceed the terminal-side value balance or exceeds a predetermined value will be described.

In the example described above, if the electronic money application 29 determines that the temporary payment amount does not exceed the terminal-side value balance or the temporary payment amount exceeds a predetermined value (for example, the remaining 1,000 yen or 500 yen), the electronic money application 29 sends out data providing a notification to that effect.

In this modified example, the asynchronous payment terminal 7 has the function of outputting an ultrasonic wave of a frequency corresponding to each price range to which the temporary payment amount belongs, for example, each of 500 yen and 1,000 yen.

Then, the mobile terminal 5 receives this ultrasonic wave with the microphone 20 and identifies the price range corresponding to the frequency of the ultrasonic wave. Then, based on the result of a comparison between the identified price range and the terminal-side value balance, the mobile terminal 5 determines whether or not to notify the user of the possibility of a shortage of the balance. The method of notification is the same as the above-described example. By so doing, it is possible to give a warning that payment is likely to become impossible due to a shortage of the terminal-side value balance.

Next, if a plurality of asynchronous payment terminals 7 are installed in one store, the asynchronous payment terminals 7 are usually installed in locations close to each other.

Therefore, there is a possibility that one mobile terminal 5 receives ultrasonic waves from the plurality of asynchronous payment terminals 7 close to each other and processing is disrupted.

Thus, the asynchronous payment terminals 7 output ultrasonic waves having different patterns, whereby the mobile terminal 5 can identify each ultrasonic wave.

Specifically, as for an ultrasonic wave to be emitted, settings are made such that ON/OFF of an ultrasonic wave of a fixed frequency is repeated periodically, whereby the asynchronous payment terminals 7 are made to have time slots of different lengths. Moreover, an ID indicating each asynchronous payment terminal 7 may be assigned to each period (for example, at the beginning of an ON signal of an ultrasonic wave).

Moreover, as for an ultrasonic wave to be emitted, settings are made such that switching between ultrasonic waves of different frequencies (for example, two fixed frequencies) is repeated periodically, whereby the asynchronous payment terminals 7 are made to have time slots of different lengths. Furthermore, an ID indicating each asynchronous payment terminal 7 may be assigned to each period (for example, at the beginning of an ultrasonic wave of any one of the frequencies).

Next, other embodiments will be described.

As the payment terminal which is installed in each member store, there are a payment terminal that accepts payment using the terminal-side value balance and a payment terminal that accepts payment using the server-side value balance. Specifically, the payment terminal that accepts payment using the server-side value balance is the synchronous-type payment terminal 6 which is online, and the payment terminal that accepts payment using the terminal-side value balance is the asynchronous payment terminal 7 (which has the function of generating a command for updating data stored in the IC module 30) which is offline or an asynchronous payment terminal (which has the function of acquiring a command from a server device (which is not the electronic money server 2) generating a command for updating data stored in the IC module 30 and sending the command to the IC module) which is online. Moreover, there is also a hybrid-type payment terminal that can accept payment using both value balances.

Thus, an ultrasonic wave of a frequency corresponding to value that can or/and cannot be accepted is continuously output from the speaker of each payment terminal. For example, when payment using the server-side value balance is temporarily impossible in the hybrid-type payment terminal, the mobile terminal 5 can determine such a situation.

In this case, when the user approaches or enters a member store, the mobile terminal 5 receives the ultrasonic wave with the microphone 20 and determines the type of value by which payment is possible. In particular, the mobile terminal 5 may determine whether or not payment using the server-side value balance is impossible and whether or not payment using the terminal-side value balance is possible.

As a result, if it is determined that payment using the server-side value balance is possible, payment is performed by the mobile terminal 5 by using the server-side value balance. In this case, shifting (downloading) of value is not performed.

On the other hand, if it is determined that payment using the server-side value balance is impossible but payment using the terminal-side value balance is possible, as described in the above-described embodiment, the server-side value balance is shifted (downloaded) to the terminal's side from the electronic money server 2 and payment is performed by using the terminal-side value balance.

By so doing, irrespective of the type of the installed payment terminal, the user can perform payment without experiencing inconvenience.

According to this embodiment, by using the existing asynchronous payment terminal 7, the existing mobile terminal 5, IC module 30, and electronic money server 2, the server-side value stored in the electronic money server 2 is automatically transferred to the side of the mobile terminal 5 immediately before payment, whereby it is possible to perform payment with an asynchronous-type payment terminal having only the payment function using the terminal-side value balance.

EXPLANATIONS OF LETTERS OR NUMERALS 1 electronic money system
2 electronic money server
3 the Internet
4 electronic money card
5 mobile terminal
6 synchronous-type payment terminal
7 asynchronous payment terminal
8 communication line
11 CPU
12 ROM
13 RAM
14 input section
15 output section
16 communication controlling section
17 short-distance communication controlling section
18 storing section
19 bus line
20 microphone
21 acceleration sensor
22 speaker
23 GPS receiver
26 information processing section
27 storing section
29 electronic money application
30 IC module
31 CPU
32 ROM
33 RAM
34 communication controlling section
35 storing section
36 bus line
100 electronic money card
145 speaker

The invention claimed is:

1. An electronic money system comprising:
a mobile terminal that is accessible to an integrated circuit (IC) module, wherein the IC module is configured to:
store a terminal-side balance of electronic value, and
change the terminal-side balance by using amount change information;
a server device that includes at least one processor configured to:
generate amount change information which changes the terminal-side balance, send the generated amount change information to the IC module via the mobile terminal, store a server-side balance that is usable for payment using electronic value in a state in which the server-side balance is related to the IC module, and update the server-side balance; and an asynchronous-type payment terminal that includes at least one processor configured to send, to the IC module, the amount change information related to a settlement which changes the terminal-side balance;

an ultrasonic wave emission source that emits an ultrasonic wave in a vicinity of the asynchronous-type payment terminal, wherein the mobile terminal includes:

a storage configured to store an approach pattern indicating a pattern of a volume level which is observed when a microphone that inputs the emitted ultrasonic wave approaches the ultrasonic wave emission source, and at least one processor configured to send, when a determination is made that a volume level of the ultrasonic wave which is input by the microphone corresponds to the approach pattern stored in the storage, an electronic value downloading request to the server device such that at least part of the server-side balance stored in a state in which the server-side balance is related to the IC module is reduced and the terminal-side balance stored in the IC module is increased by an amount corresponding to the reduction of the server-side balance.

2. The electronic money system according to claim 1, wherein the storage of the mobile terminal is further configured to store a moving-away pattern indicating a pattern of a volume level which is observed when the microphone moves away from the ultrasonic wave emission source, and the at least one processor of the mobile terminal is further configured to send, when a determination is made that a volume level of the ultrasonic wave which is input by the microphone corresponds to the stored moving-away pattern, an electronic value uploading request to the server device such that at least part of the terminal-side balance stored in the IC module is reduced and the server-side balance stored in a state in which the server-side balance is related to the IC module is increased by an amount corresponding to the reduction of the terminal-side balance.

3. The electronic money system according to claim 2, wherein the at least one processor of the mobile terminal is further configured to send the uploading request including an uploading amount which is set such that the terminal-side balance is more than or equal to a predetermined amount that is left.

4. The electronic money system according to claim 1, wherein the asynchronous-type payment terminal further includes a speaker corresponding to the ultrasonic wave emission source, the speaker outputs the ultrasonic wave indicating that payment cannot be made using the server-side balance, and the at least one processor of the mobile terminal is further configured to send the downloading request when it is determined, that payment using the server-side balance cannot be made, based on the ultrasonic wave which is input by the microphone.

5. The electronic money system according to claim 4, wherein the speaker outputs an ultrasonic wave of a sound pattern whose volume level varies with a predetermined period such that a distinction from other payment terminals installed in a vicinity thereof is made.

6. The electronic money system according to claim 5, wherein the speaker further outputs, every time a price of an object whose payment is to be performed is registered, an ultrasonic wave for determining a price range, the ultrasonic wave of a frequency related to a price range in a predetermined amount region to which a temporary payment amount to the point of time belongs, and the at least one processor of mobile terminal is further configured to:

determine a price range based on the ultrasonic wave for determining a price range, the ultrasonic wave which is output, and notify, when a determination is made that the determined price range is identical to a price range to which the terminal-side balance stored in the IC module belongs or corresponds to a price range lower than the price range to which the terminal-side balance stored in the IC module belongs by a predetermined level, a user that the terminal-side balance is insufficient for a payment amount.

7. The electronic money system according to claim 5, wherein the speaker outputs, every time a price of an object whose payment is to be performed is registered, a temporary payment amount to the point of time over the ultrasonic wave, and the at least one processor of mobile terminal is further configured to:

acquire the temporary payment amount which is output over the ultrasonic wave, and notify, when a determination is made that a difference between the acquired temporary payment amount and the terminal-side balance stored in the IC module is smaller than a predetermined threshold value, a user that the terminal-side balance is insufficient for a payment amount.

8. The electronic money system according to claim 4, wherein the speaker outputs an ultrasonic wave of a sound pattern whose frequency varies with a predetermined period such that a distinction from other payment terminals installed in a vicinity thereof is made.

9. The electronic money system according to claim 1, further comprising:

a hybrid-type payment terminal including at least one processor configured to:

send, to the IC module, amount change information related to a settlement which changes the terminal-side balance, mediate, in real time, payment processing using the server-side balance, the payment processing which is performed between the IC module and the server device, and a speaker corresponding to the ultrasonic wave emission source, wherein the speaker outputs the ultrasonic wave indicating that payment using the server-side balance cannot be made for a predetermined time period when payment using the server-side balance cannot be made for the predetermined time period, and the at least one processor of the mobile terminal is further configured to send the downloading request when it is determined, that payment using the server-side balance cannot be made based on the ultrasonic wave which is input by the microphone.

10. An electronic value transfer method, performed by at least one processor of a mobile terminal connected to an integrated circuit (IC) module, the method comprising:

storing in a storage, by the IC module, a terminal-side balance of electronic value, changing, by the IC module, the terminal-side balance by using amount change information, storing, by the at least one processor of the mobile terminal, an approach pattern indicating a pattern of a volume level which is observed when a microphone that inputs an ultrasonic wave which is emitted from an ultrasonic wave emission source emitting an ultrasonic wave in a vicinity of an asynchronous-type payment terminal approaches the ultrasonic wave emission source, the asynchronous-type payment terminal includes at least one processor sending, to the IC module, the amount change information related to a settlement which changes the terminal-side balance, and determining, by the at least one processor of the mobile terminal, whether or not a volume level of the ultrasonic wave which is input by the microphone corresponds to the stored approach pattern sending, by the at least one processor of the mobile terminal, an electronic value downloading request to a server device when a determination is made that the volume level of the ultrasonic wave which is input by the microphone corresponds to the approach pattern, the method further comprising:

storing, by the server device, a server-side balance that is usable for payment using electronic value in a state in which the server-side balance is related to the IC module performs server-side balance updating processing by which at least part of the server-side balance stored in a state in which the server-side balance is related to the IC module is reduced, generating, by the server device, amount change information which increases the terminal-side balance stored in the IC module by an amount corresponding to the reduction of the server-side balance, and sending, by the server device, the generated amount change information to the IC module via the mobile terminal.

11. A mobile terminal that mediates communication between an integrated circuit (IC) module and a server device, wherein the IC module is configured to:
 store a terminal-side balance of electronic value, and
 change the terminal-side balance by using amount change information, the server device is configured to:
 generate amount change information which changes the terminal-side balance, and
 send the generated amount change information to the IC module via the mobile terminal, the mobile terminal is configured to:
 store an approach pattern indicating a pattern of a volume level which is observed when a microphone that inputs an ultrasonic wave which is emitted from an ultrasonic wave emission source emitting an ultrasonic wave in a vicinity of an asynchronous-type payment terminal approaches the ultrasonic wave emission source, the asynchronous-type payment terminal includes at least one processor configured to send, to the IC module, the amount change information related to a settlement which changes the terminal-side balance;

determine whether or not a volume level of the ultrasonic wave which is input by the microphone corresponds to the stored approach pattern; and send, when it is determined that the volume level of the ultrasonic wave which is input by the microphone corresponds to the approach pattern, an electronic value downloading request to the server device, wherein the server device is further configured to:
 store a server-side balance that is usable for payment using electronic value in a state in which the server-side balance is related to the IC module, and
 update the server-side balance, such that at least part of the server-side balance stored in a state in which the server-side balance is related to the IC module is reduced and the terminal-side balance stored in the IC module is increased by an amount corresponding to the reduction of the server-side balance.

* * * * *